(12) United States Patent
Suzuki

(10) Patent No.: US 12,047,703 B2
(45) Date of Patent: Jul. 23, 2024

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Yasuyuki Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/974,294

(22) Filed: Oct. 26, 2022

(65) Prior Publication Data

US 2023/0142934 A1    May 11, 2023

(30) Foreign Application Priority Data

Nov. 5, 2021 (JP) ................ 2021-181327

(51) Int. Cl.
| | | |
|---|---|---|
| *H04N 5/262* | (2006.01) | |
| *H04N 23/611* | (2023.01) | |
| *H04N 23/62* | (2023.01) | |
| *H04N 23/63* | (2023.01) | |
| *H04N 23/67* | (2023.01) | |

(52) U.S. Cl.
CPC ......... *H04N 5/2628* (2013.01); *H04N 23/611* (2023.01); *H04N 23/62* (2023.01); *H04N 23/631* (2023.01); *H04N 23/675* (2023.01)

(58) Field of Classification Search
CPC .... H04N 5/2628; H04N 23/611; H04N 23/62; H04N 23/631; H04N 23/675; H04N 23/6812
See application file for complete search history.

(56) References Cited

U.S. PATENT DOCUMENTS

2016/0364012 A1\* 12/2016 Govezensky ........... G06F 3/017

FOREIGN PATENT DOCUMENTS

JP          2009-177345 A      8/2009

\* cited by examiner

*Primary Examiner* — Yogesh K Aggarwal
(74) *Attorney, Agent, or Firm* — Cowan, Liebowitz & Latman, P.C.

(57) ABSTRACT

An electronic device according to the present invention includes at least one memory and at least one processor which function as: a reading unit configured to read an image which is a captured image and gaze information associated with the image from a recording medium; a display control unit configured to control a display; and a control unit configured to perform control to enlarge or reduce the image about a position based on the gaze information read by the reading unit when enlarging or reducing the image read by the reading unit and displayed on the display by the display control unit.

20 Claims, 24 Drawing Sheets

FIG. 2
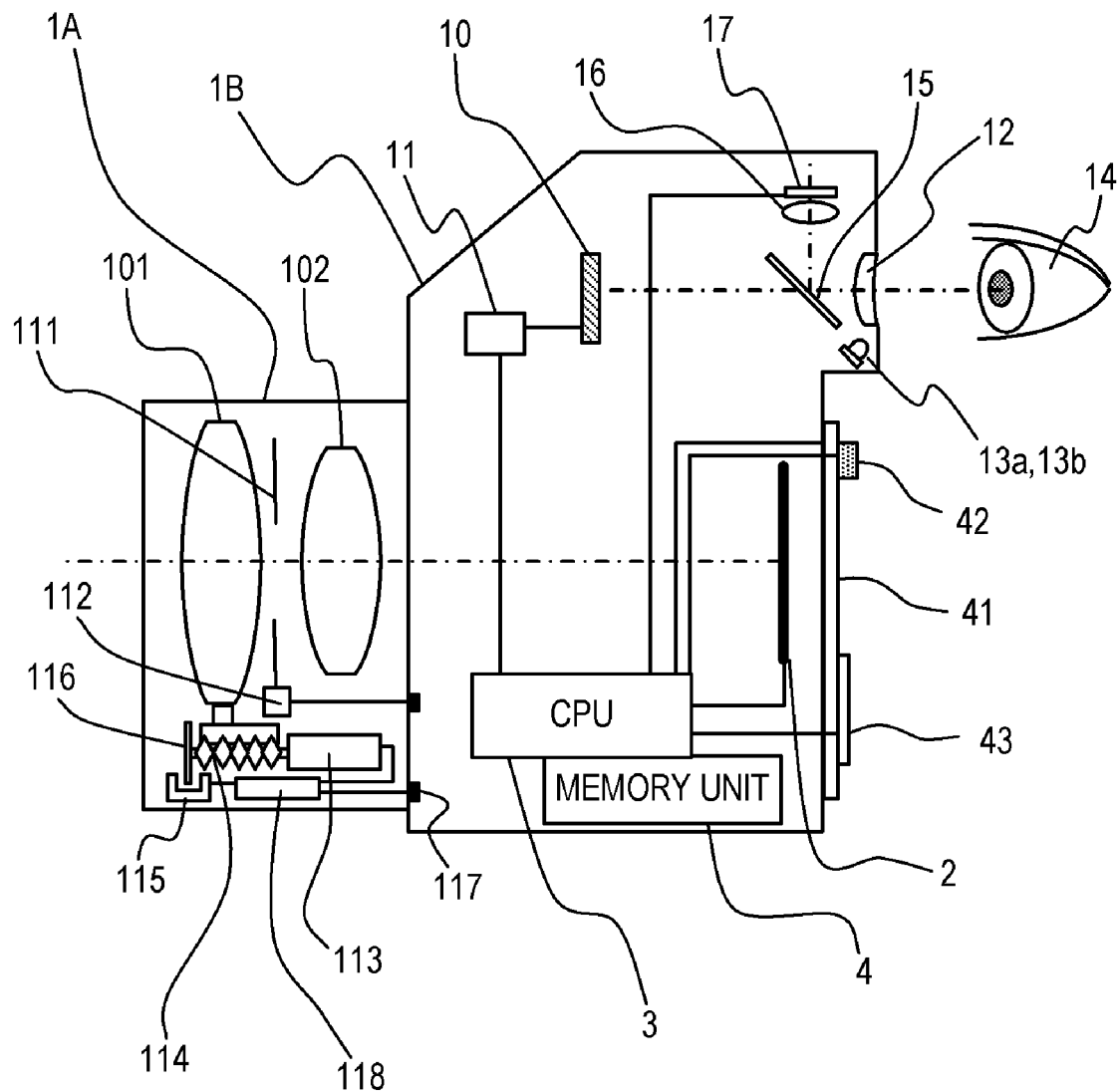
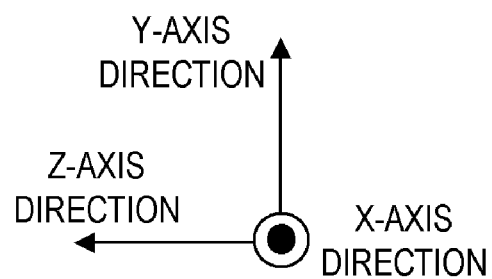

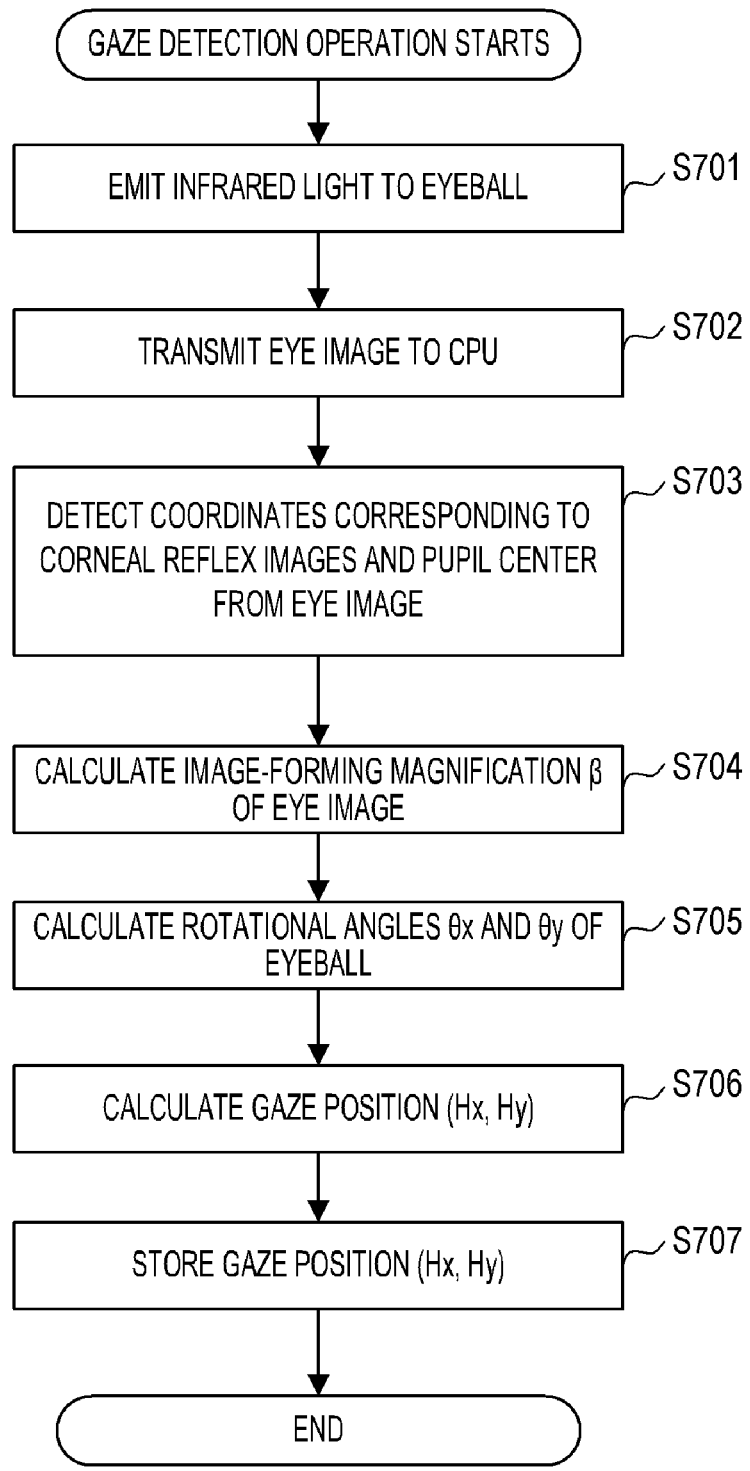

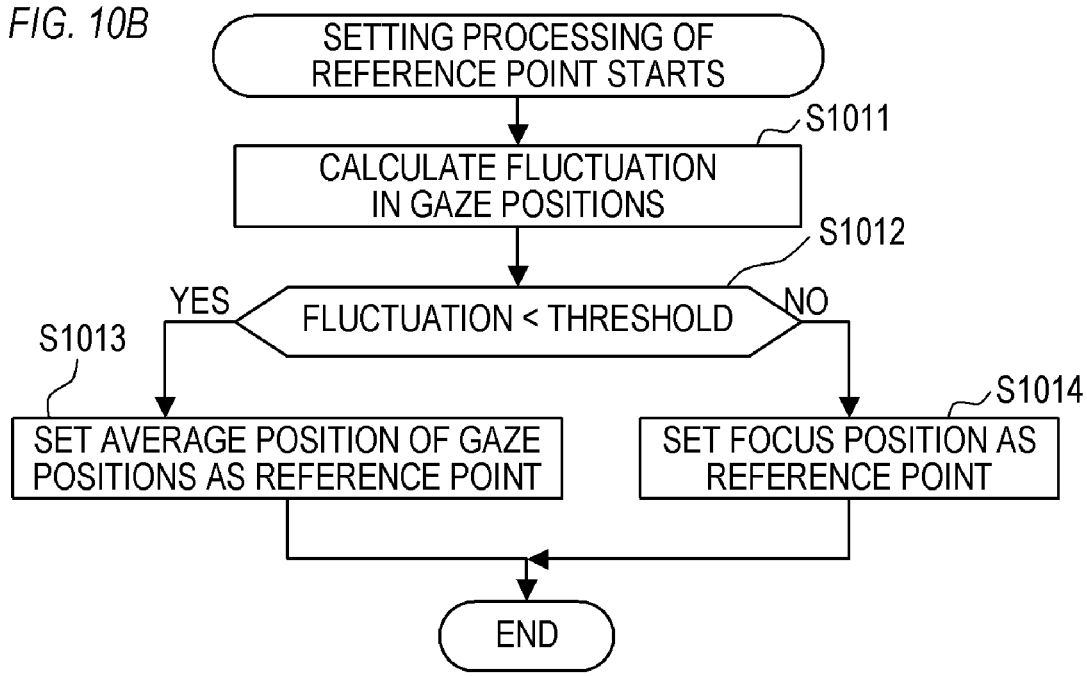
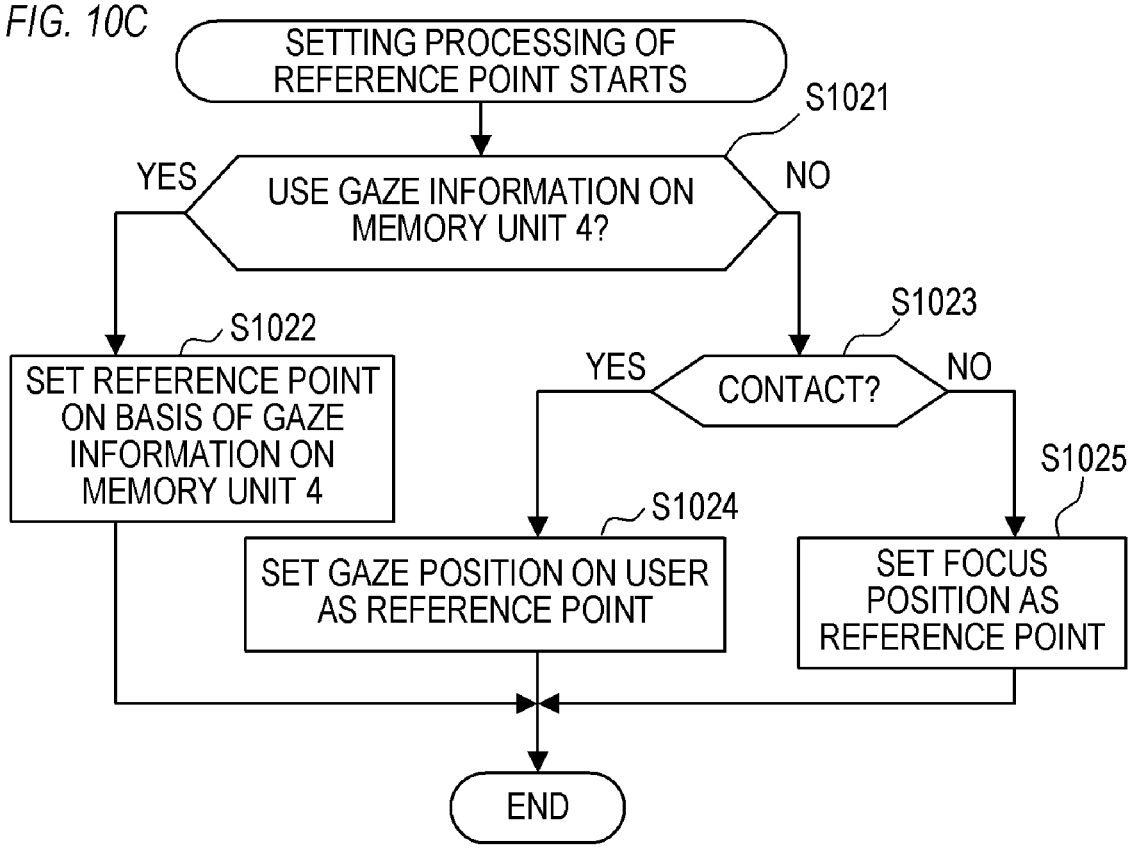

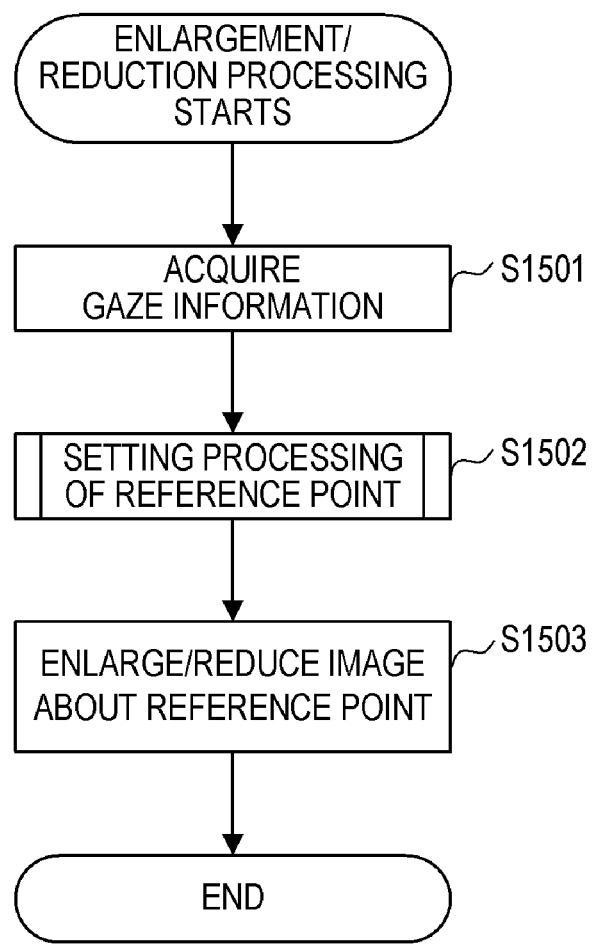

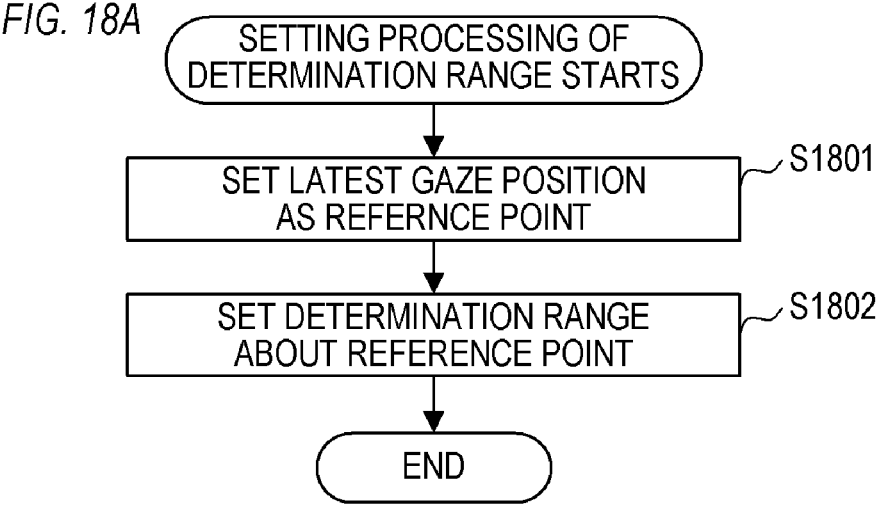
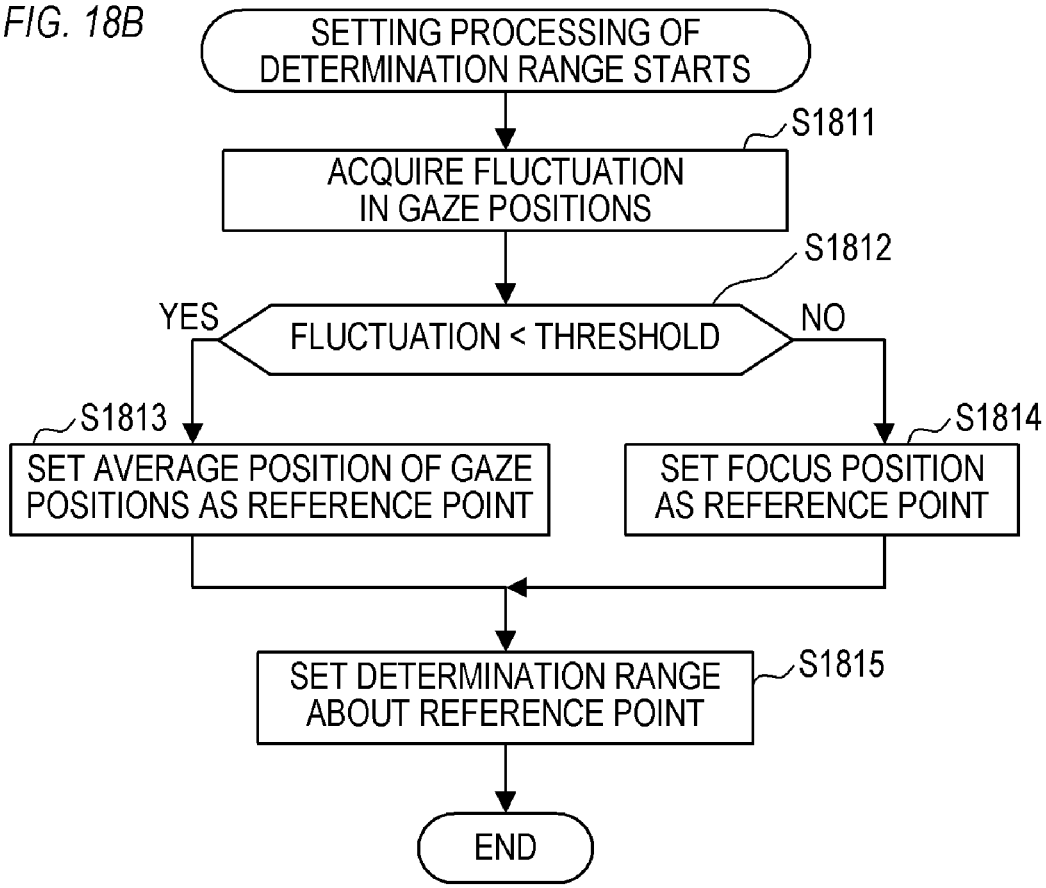

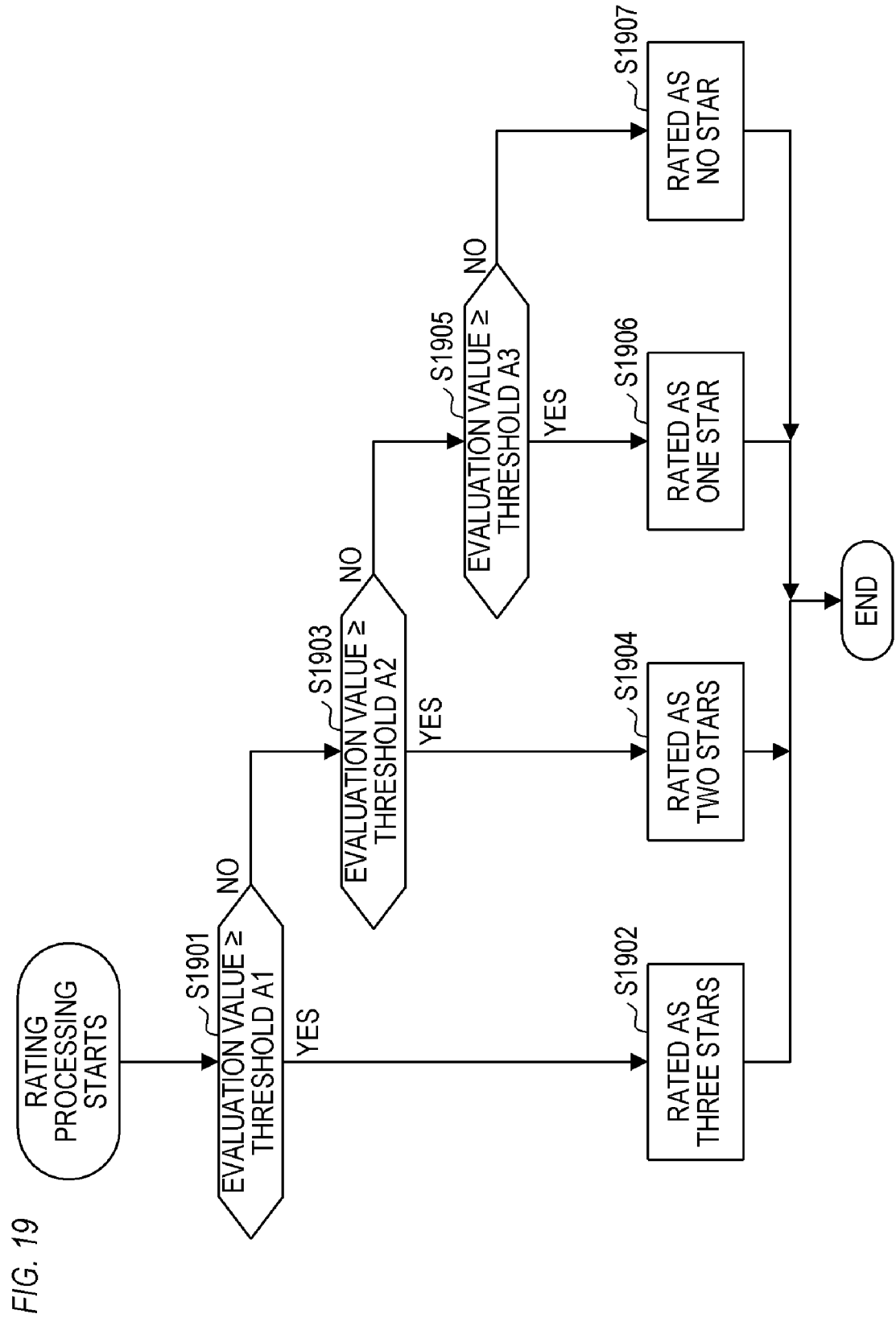

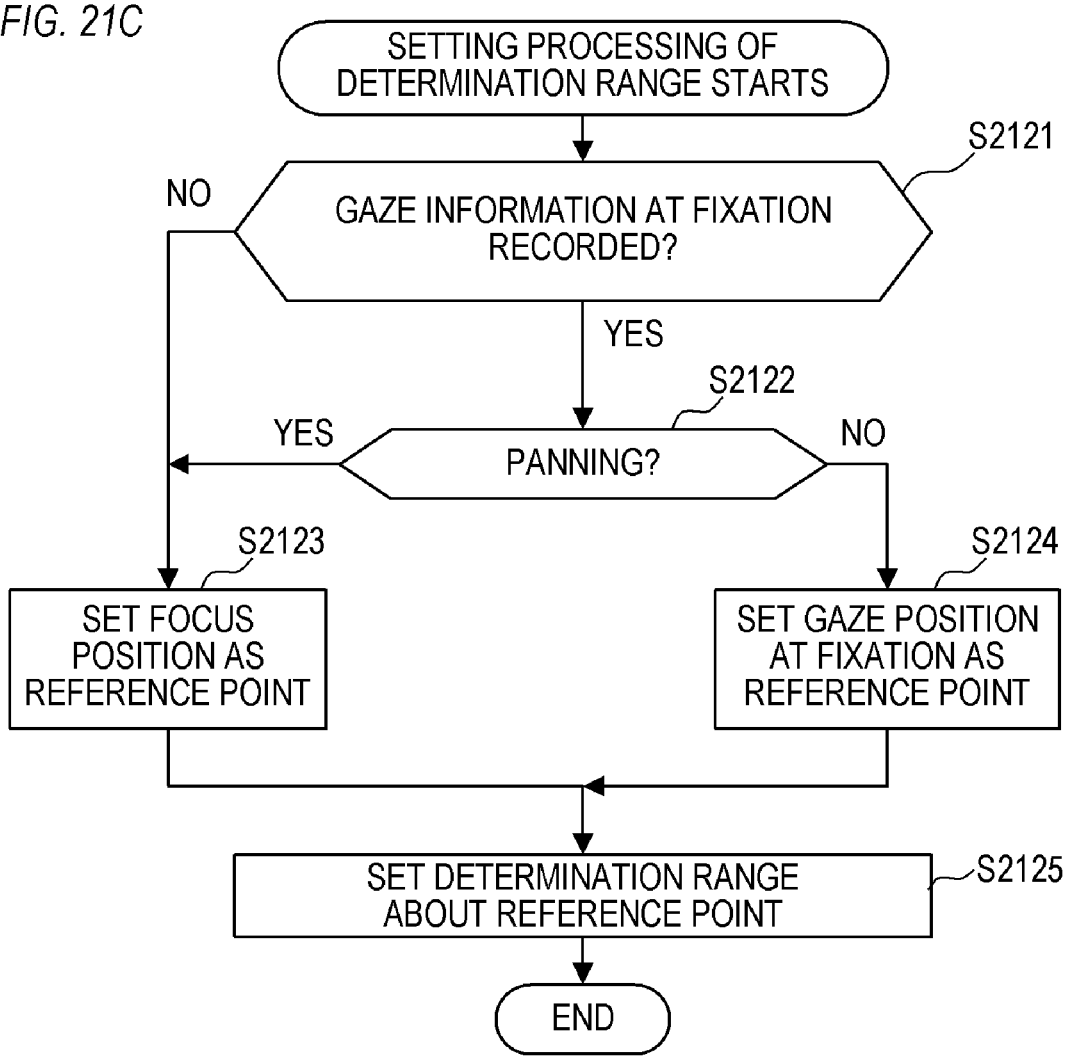

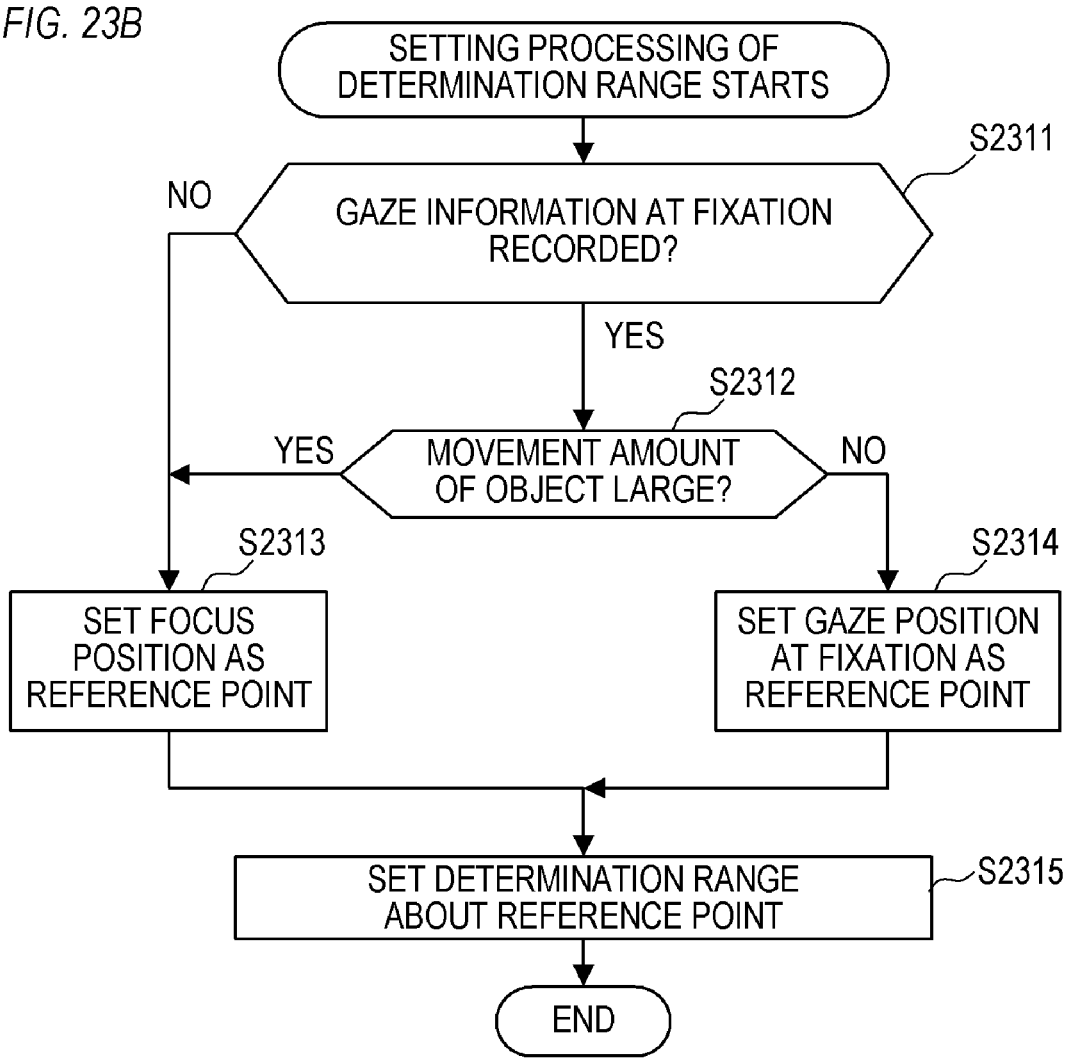

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of the electronic device, and a non-transitory computer readable medium.

Description of the Related Art

In recent years, an improvement in photographing speed has allowed the acquisition of a large amount of photographing images in a short period of time. However, the selection of photographing images or the like is difficult when the large amount of photographing images are handled. Therefore, the need for the efficiency of image confirmation is increasing. A technology relating to the efficiency of image confirmation is disclosed in, for example, Japanese Patent Application Laid-open No. 2009-177345. Japanese Patent Application Laid-open No. 2009-177345 discloses a technology to enlarge an image about a focus position.

According to the technology disclosed in Japanese Patent Application Laid-open No. 2009-177345, it is possible to easily confirm a focused region. However, since a region noticed by a photographer is not always in focus, it is not possible to easily confirm the region noticed by the photographer. For example, the operation of changing a displayed region is required after a focused region is displayed in an enlarged fashion, which takes time and effort.

SUMMARY OF THE INVENTION

The present invention provides a technique of allowing a photographer to easily confirm a noticed region.

The present invention in its first aspect provides an electronic device including at least one memory and at least one processor which function as: a reading unit configured to read an image which is a captured image and gaze information associated with the image from a recording medium; a display control unit configured to control a display; and a control unit configured to perform control to enlarge or reduce the image about a position based on the gaze information read by the reading unit when enlarging or reducing the image read by the reading unit and displayed on the display by the display control unit.

The present invention in its third aspect provides a non-transitory computer readable medium that stores a program, wherein the program causes a computer to execute a control method of an electronic device, including: a reading step of reading an image which is a captured image and gaze information associated with the image from a recording medium; a display control step of controlling a display unit; and a control step of performing control to enlarge or reduce the image about a position based on the gaze information read in the reading step when enlarging or reducing the image read in the reading step and displayed on the display unit in the display control step.

Further features of the present invention will become apparent from the following description of exemplary embodiments with reference to the attached drawings.

BRIEF DESCRIPTION OF THE DRAWINGS

FIG. 2 is a cross-sectional view of the camera according to the first embodiment;

FIG. 7 is a flowchart of a gaze detection operation according to the first embodiment;

FIGS. 10A to 10C are flowcharts of the setting processing of a reference point according to the first embodiment;

FIG. 15 is a flowchart of reproduction processing (enlargement/reduction processing) according to the third embodiment;

FIGS. 18A and 18B are flowcharts of the setting processing of a determination range according to the fourth embodiment;

FIG. 19 is a flowchart of rating processing according to the fourth embodiment;

FIGS. 21A to 21C are flowcharts of the setting processing of a determination range according to the fifth embodiment;

FIGS. 23A and 23B are flowcharts of the setting processing of a determination range according to the fifth embodiment.

DESCRIPTION OF THE EMBODIMENTS

First Embodiment

Hereinafter, a first embodiment of the present invention will be described with reference to the accompanying drawings.

Description of Configuration

Figure 1A:
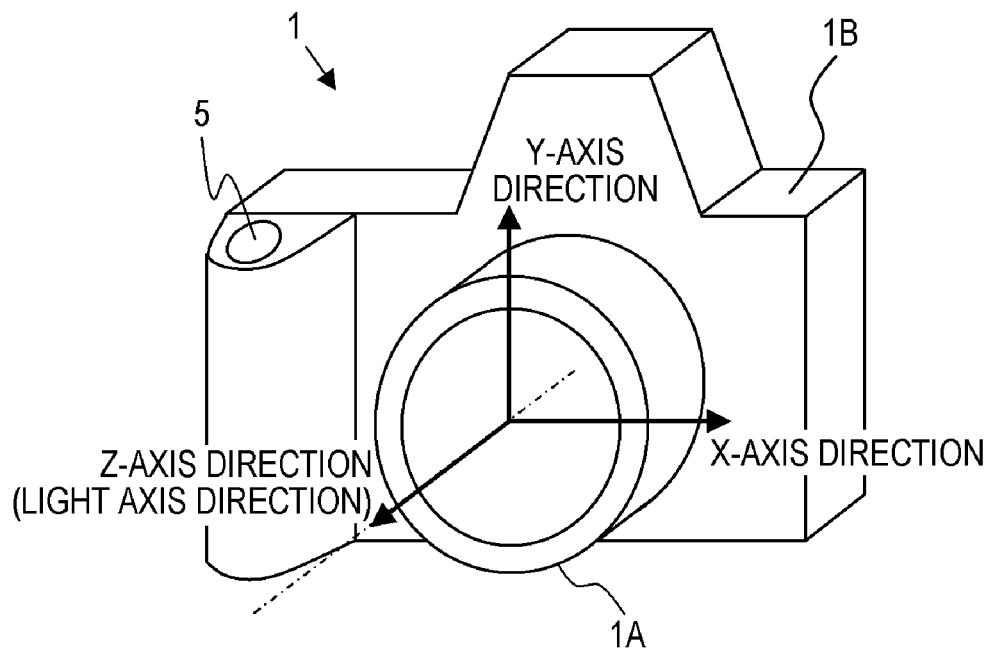
FIGS. 1A and 1B are appearance views of a camera according to a first embodiment.
Figure 1B:
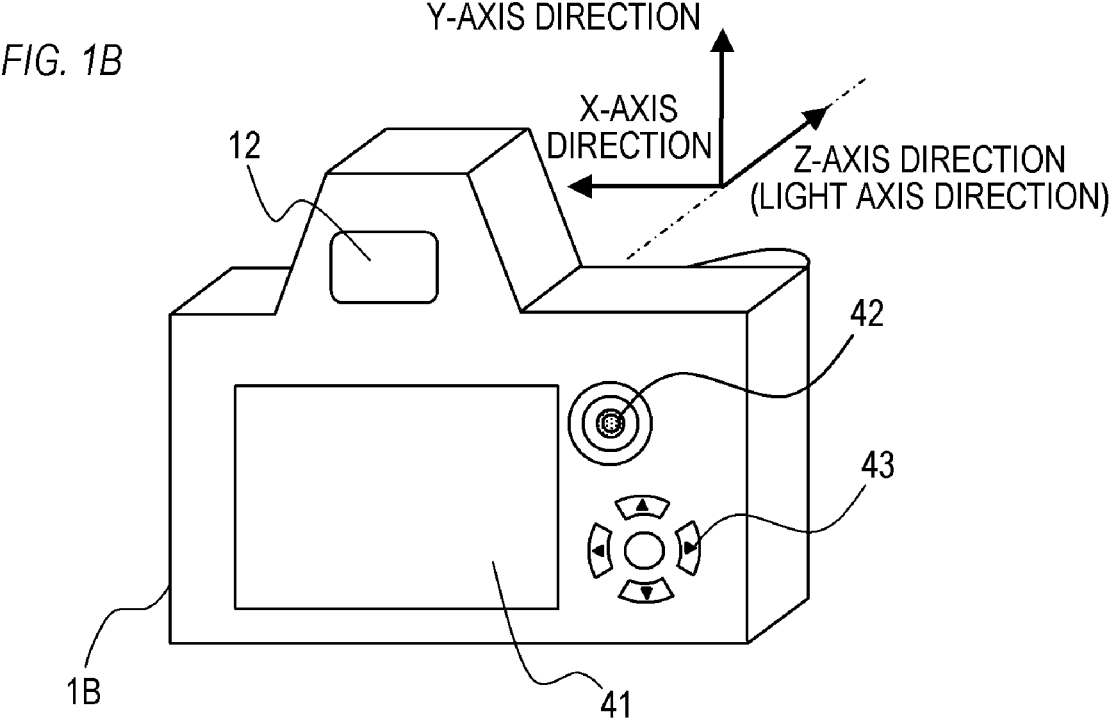

FIGS. 1A and 1B show the appearance of a camera 1 (a digital still camera; a lens replacement camera) according to the first embodiment. FIG. 1A is a front perspective view, and FIG. 1B is a rear perspective view. As shown in FIG. 1A, the camera 1 has a photographing lens unit 1A and a camera housing 1B. In the camera housing 1B, a release button 5 that is an operation member for receiving a photographing operation from a user (photographer) is arranged. As shown in FIG. 1B, an eyepiece 12 (an eyepiece optical system) through which the user looks into an after-mentioned display device 10 (display panel) included in the camera housing 1B is arranged in the rear surface of the camera housing 1B. Note that the eyepiece optical system may include a plurality of lenses. In the rear surface of the camera housing 1B, operation members 41 to 43 that receive various operations from the user are also arranged. For example, the operation member 41 is a touch panel that receives a touch operation, the operation member 42 is an operation lever capable of being pushed down in respective directions, and the operation member 43 is a four-way key capable of being pressed down in each of four directions. The operation member 41 (touch panel) includes a display panel such as a liquid-crystal panel and has the function of displaying an image on the display panel.

FIG. 2 is a cross-sectional view in which the camera 1 is cut out along a YZ plane formed by Y and Z axes shown in FIG. 1A, and shows the rough inside configuration of the camera 1.

In the photographing lens unit 1A, two lenses 101 and 102, an aperture 111, an aperture driving unit 112, a lens driving motor 113, a lens driving member 114, a photocoupler 115, a pulse plate 116, a mount contact 117, a focal adjustment circuit 118, and the like are included. The lens driving member 114 is composed of a driving gear or the like. The photocoupler 115 detects the rotation of the pulse plate 116 that interlocks with the lens driving member 114 and transmits the same to the focal adjustment circuit 118. The focal adjustment circuit 118 drives the lens driving motor 113 on the basis of information from the photocoupler 115 and information (information on a lens driving amount) from the camera housing 1B and moves the lens 101 to change a focal position. The mount contact 117 is an interface between the photographing lens unit 1A and the camera housing 1B. Note that the two lenses 101 and 102 are shown for simplicity but two or more lenses are actually included in the photographing lens unit 1A.

In the camera housing 1B, an imaging element 2, a CPU 3, a memory unit 4, a display device 10, a display-device driving circuit 11, and the like are included. The imaging element 2 is arranged on a surface on which an image is to be formed by the photographing lens unit 1A. The CPU 3 is the central processing unit of a microcomputer and entirely controls the camera 1. The memory unit 4 stores an image captured by the imaging element 2 or the like. The display device 10 is composed of a liquid crystal or the like and displays a captured image (object image) or the like on the screen (display screen) of the display device 10. The display-device driving circuit 11 drives the display device 10. The user is allowed to look the screen of the display device 10 through the eyepiece 12.

In the camera housing 1B, light sources 13a and 13b, a light splitter 15, a light-receiving lens 16, an eye imaging element 17, and the like are also included. The light sources 13a and 13b are conventionally used in a single-lens reflex camera or the like to detect a gaze (line-of-sight) direction from the relationship between a reflected image (corneal reflex image) by the corneal reflex of light and a pupil and illuminate an eyeball 14 of the user. Specifically, the light sources 13a and 13b are infrared light-emitting diodes or the like that emit unperceivable infrared light to the user and arranged around the eyepiece 12. An optical image of the illuminated eyeball 14 (an eye image; an image formed by light emitted from the light sources 13a and 13b and reflected by the eyeball 14) passes through the eyepiece 12 and is reflected by the light splitter 15. Then, the eyeball image is formed by the light-receiving lens 16 on the eye imaging element 17 in which the lines of photoelectric elements such as CCDs are two-dimensionally arranged. The light-receiving lens 16 places the pupil of the eyeball 14 and the eye imaging element 17 in a conjugate image-forming relationship. According to an after-mentioned predetermined algorithm, the gaze direction (a gaze position; a viewed point on the screen of the display device 10) of the eyeball 14 is detected from the position of a corneal reflex image in an eye image formed on the eye imaging element 17.

Figure 3:
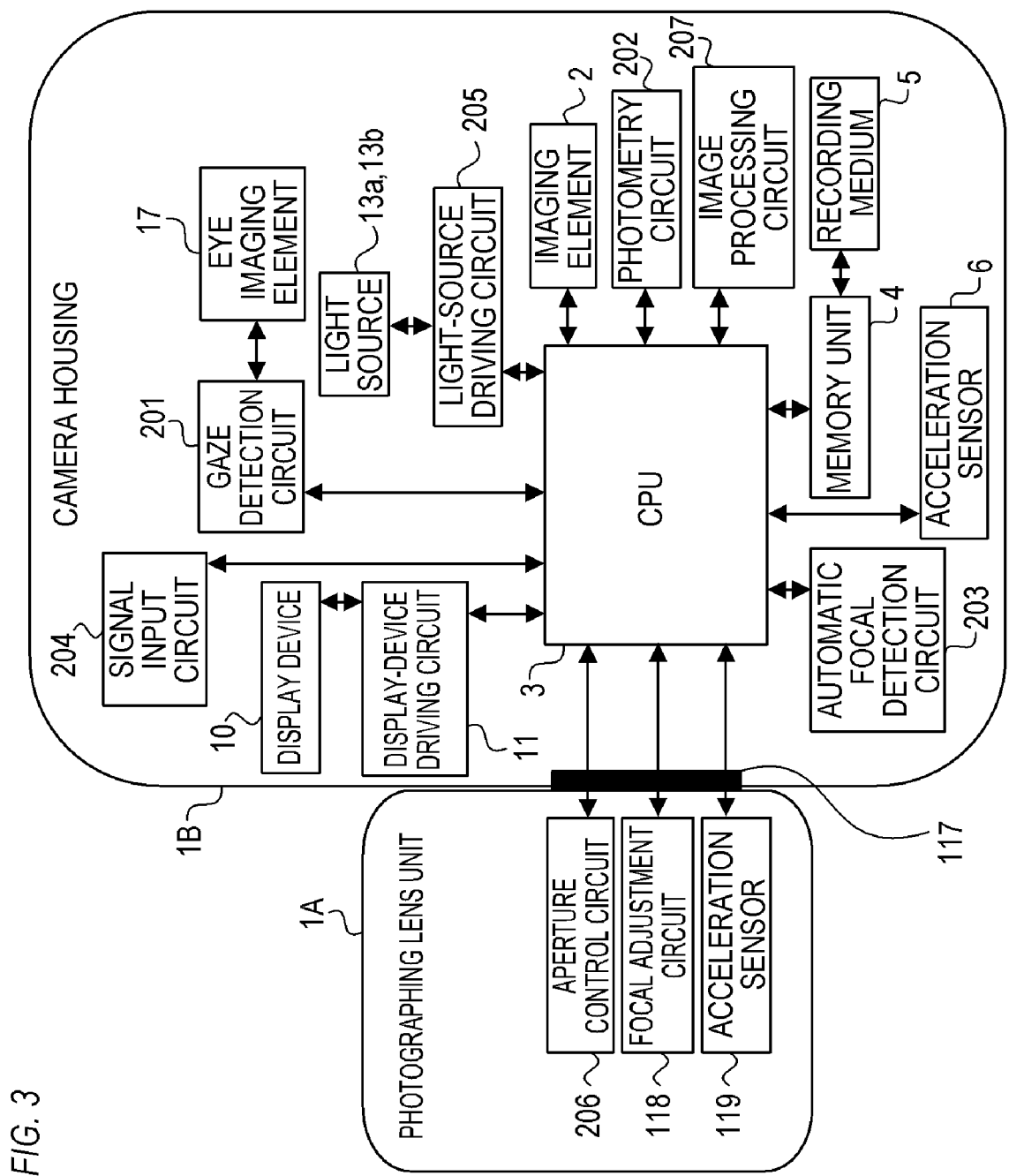
FIG. 3 is a block diagram of the camera according to the first embodiment.

FIG. 3 is a block diagram showing an electric configuration inside the camera 1. The CPU 3 is connected to a gaze detection circuit 201, a photometry circuit 202, an automatic focal detection circuit 203, a signal input circuit 204, a display-device driving circuit 11, a light-source driving circuit 205, and the like. Further, the CPU 3 transmits a signal to the focal adjustment circuit 118 arranged inside the photographing lens unit 1A and an aperture control circuit 206 included in the aperture driving unit 112 inside the photographing lens unit 1A via the mount contact 117. The memory unit 4 annexed to the CPU 3 has the function of storing an imaging signal from the imaging element 2 and the eye imaging element 17. The CPU 3 converts an imaging signal stored in the memory unit 4 into a photographed image and transfers the photographed image to the recording medium 5. An acceleration sensor 6 detects the size of acceleration applied to the camera housing 1B and transmits the result to the CPU 3. The acceleration sensor 119 detects the size of acceleration applied to the photographing lens unit 1A and transmits the result to the CPU 3.

The gaze detection circuit 201 performs the A/D conversion of the output (an eye image obtained by capturing an eye) of the eye imaging element 17 in a state in which an eyeball image is formed on the eye imaging element 17 (CCD-EYE), and transmits the result to the CPU 3. The CPU 3 extracts a characteristic point necessary for detecting a gaze according to an after-mentioned predetermined algorithm and calculates the gaze (a viewed point on the screen of the display device 10) of the user from the position of the characteristic point.

The photometry circuit 202 performs the amplification, logarithmic compression, A/D conversion, or the like of a signal obtained from the imaging element 2 serving also as a photometry sensor, specifically a brightness signal corresponding to the brightness of a field and transmits the result to the CPU 3 as field brightness information.

The automatic focal detection circuit 203 performs the A/D conversion of a signal voltage from a plurality of detection elements (a plurality of pixels) that are included in the CCD of the imaging element 2 and used for phase difference detection and transmits the resulting signal voltage to the CPU 3. The CPU 3 calculates distances to an object corresponding to respective focal detection points from the signals of the plurality of detection elements. This is a technology known as imaging surface phase difference AF. In the first embodiment, it is assumed as an example that a focal detection point exists in each of 180 spots on an imaging surface corresponding to 180 spots shown in an in-finder visual-field image (the screen of the display device 10) of FIG. 4.

The signal input circuit 204 is connected to a switch SW1 that is turned on by a first stroke of the release button 5 and used to start the photometry, ranging, gaze detection operation, or the like of the camera 1 and connected to a switch SW2 that is turned on by a second stroke of the release button 5 and used to start a photographing operation. An ON signal from the switches SW1 and SW2 is input to the signal input circuit 204 and transmitted to the CPU 3.

The light-source driving circuit 205 drives the light sources 13a and 13b.

An image processing circuit 207 applies predetermined image processing to image data to generate a signal or image data or acquire and/or generate various information. The image processing circuit 207 may be, for example, a dedicated hardware circuit such as an ASIC designed to realize a specific function, or may be configured to realize a specific function when a processor such as a DSP performs software.

Here, the image processing applied by the image processing circuit 207 includes pre-processing, color interpolation processing, correction processing, detection processing, data processing, or the like. The pre-processing includes signal amplification, reference-level adjustment, defect-pixel correction, or the like. The color interpolation processing is processing to interpolate the value of a color component not included in image data and also called demosaic processing. The correction processing includes white balance adjustment, processing to correct the brightness of an image, processing to correct the optical aberration of the photographing lens unit 1A, processing to correct a color, or the like. The detection processing includes processing to detect and track a characteristic region (for example, a face region, a human-body region, or an object region), processing to recognize a person, or the like. The data processing includes scaling processing, coding and decoding processing, header-information generation processing, or the like. Note that the above processing exemplifies image processing capable of being performed by the image processing circuit 207 and does not limit the image processing performed by the image processing circuit 207.

Figure 4:
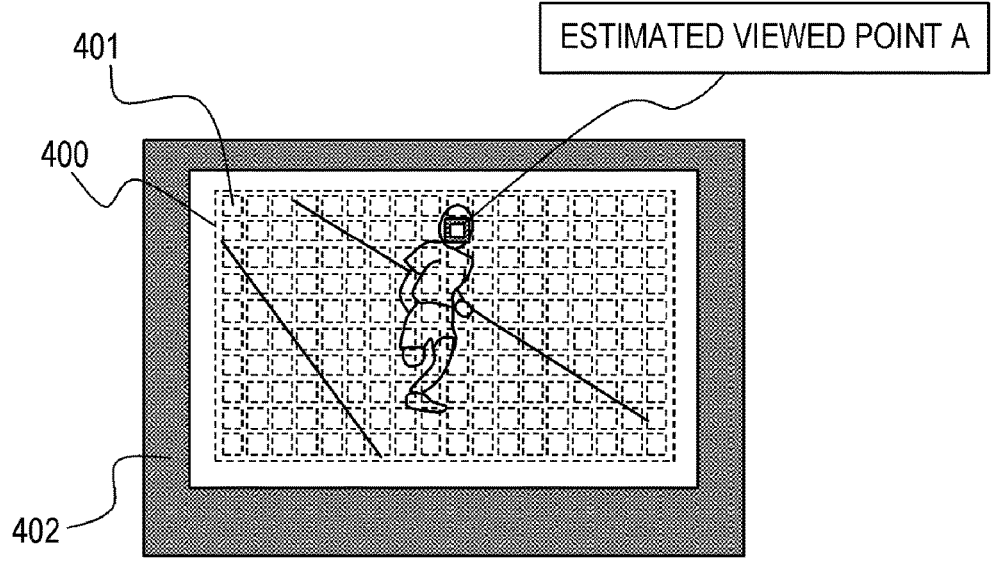
FIG. 4 is a view showing an in-finder visual field according to the first embodiment.

FIG. 4 is a view showing an in-finder visual field and shows a state in which the display device 10 is operated (a state in which an image is displayed). As shown in FIG. 4, the in-finder visual field includes a focal detection region 400, 180 ranging-point indexes 401, a visual-field mask 402, and the like. Each of the 180 ranging-point indexes 401 is displayed superimposed on a through-image (a live-view image) displayed on the display device 10 so as to be displayed at a position corresponding to a focal detection point on an imaging surface. Further, a ranging-point index 401 corresponding to a current viewed point A (estimated position) among the 180 ranging-point indexes 401 is highlighted by a frame or the like.

Description of Gaze Detection Operation

Figure 5:
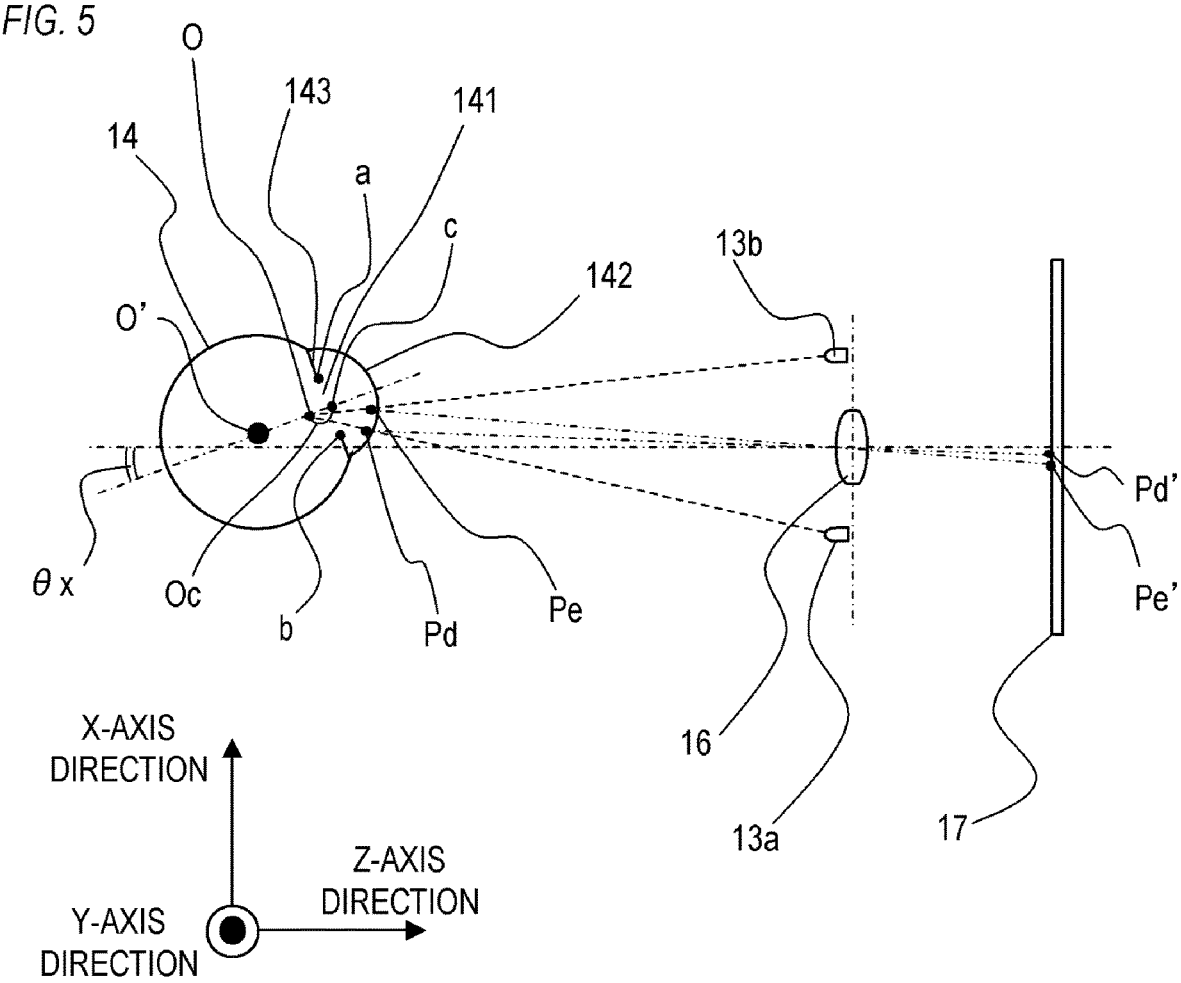
FIG. 5 is a view for describing the principle of a visual-field detection method according to the first embodiment.
Figure 6A:
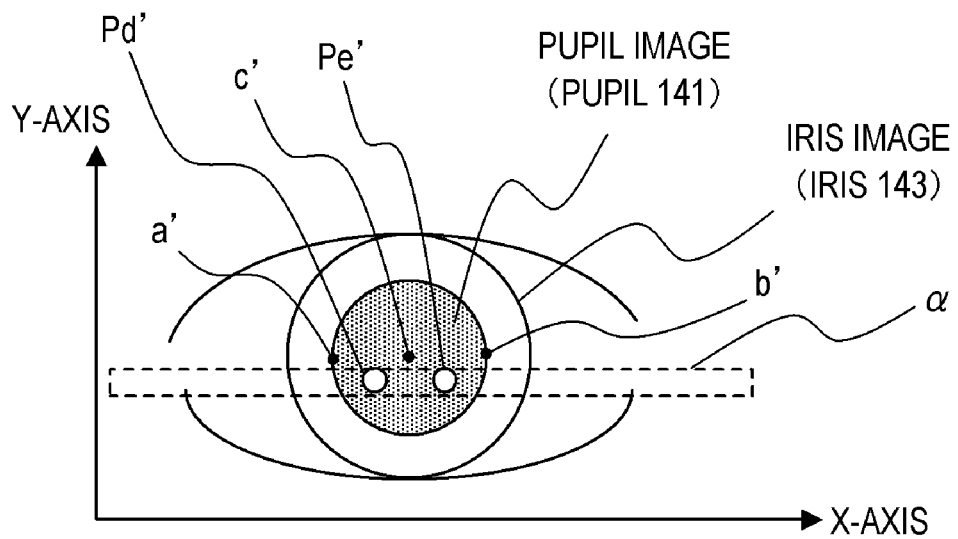
FIG. 6A is a view showing an eye image according to the first embodiment.
Figure 6B:
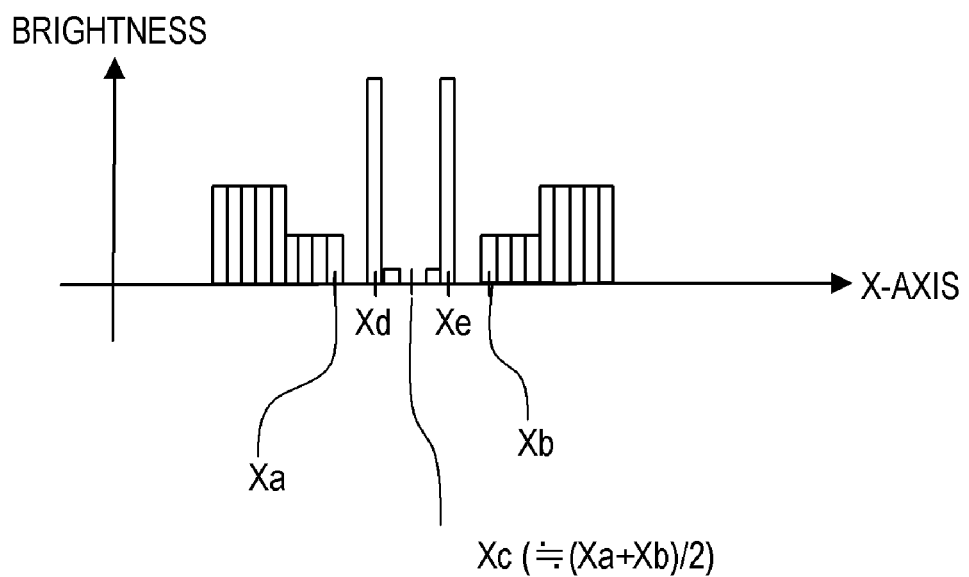
FIG. 6B is a view showing the brightness distribution of the eye image according to the first embodiment.

A gaze detection operation will be described using FIGS. 5, 6A, 6B, and 7. FIG. 5 is a view for describing the principle of the gaze detection method and is a schematic view of an optical system for performing gaze detection. As shown in FIG. 5, the light sources 13a and 13b are arranged to be substantially symmetric with respect to the light axis of the light-receiving lens 16 and illuminates the eyeball 14 of the user. A part of light emitted from the light sources 13a and 13b and reflected by the eyeball 14 is condensed onto the eye imaging element 17 by the light-receiving lens 16. FIG. 6A is a schematic view of an eye image (an eyeball image projected onto the eye imaging element 17) captured by the eye imaging element 17. FIG. 6B is a view showing the output intensity of the CCD of the eye imaging element 17. FIG. 7 shows a schematic flowchart of the gaze detection operation.

When the gaze detection operation starts, the light sources 13a and 13b emit infrared light to the eyeball 14 of the user in step S701 of FIG. 7. An eyeball image of the user illuminated by the infrared light is formed on the eye imaging element 17 via the light-receiving lens 16 and photoelectrically converted by the eye imaging element 17. Thus, a processible eye-image electric signal is obtained.

In step S702, the gaze detection circuit 201 transmits the eye image (the eye-image signal; the eye-image electric signal) obtained from the eye imaging element 17 to the CPU 3.

In step S703, the CPU 3 calculates the coordinates of points corresponding to corneal reflex images Pd and Pe and a pupil center c of the light sources 13a and 13b from the eye image obtained in step S702.

The infrared light emitted from the light sources 13a and 13b illuminates a corneal 142 of the eyeball 14 of the user. At this time, the corneal reflex images Pd and Pe formed by a part of the infrared light reflected on the surface of the corneal 142 are condensed by the light-receiving lens 16 and formed on the eye imaging element 17 to turn into corneal reflex images Pd' and Pe' in the eye image. Similarly, an image of a light flux from ends a and b of a pupil 141 is also formed on the eye imaging element 17 to turn into pupil end images a' and b' in the eye image.

FIG. 6B shows brightness information (brightness distribution) on a region a in the eye image of FIG. 6A. In FIG. 6B, the brightness distribution in an X-axis direction is shown with the horizontal direction of the eye image defined as the X-axis direction and the perpendicular direction thereof defined as a Y-axis direction. In the first embodiment, coordinates in the X-axis direction (horizontal direction) of the corneal reflex images Pd' and Pe' are expressed as Xd and Xe, and coordinates in the X-axis direction of the pupil end images a' and b' are expressed as Xa and Xb. As shown in FIG. 6B, extremely high-level brightness is obtained at the coordinates Xd and Xe of the corneal reflex images Pd' and Pe'. In a region from the coordinate Xa to the coordinate Xb corresponding to the region of the pupil 141 (the region of a pupil image obtained when an image of a light flux from the pupil 141 is formed on the eye imaging element 17), extremely low-level brightness is obtained except for the coordinates Xd and Xe. Further, in the region of an iris 143 outside the pupil 141 (in the region of an iris image outside the pupil image that is obtained when an image of a light flux from the iris 143 is formed), the intermediate brightness between the above two types of brightness is obtained. Specifically, the intermediate brightness between the above two types of brightness is obtained in a region smaller than the coordinate Xa in the X coordinate (coordinate in X-axis direction) and a region larger than the coordinate Xb in the X coordinate.

From the brightness distribution shown in FIG. 6B, it is possible to obtain the X coordinates Xd and Xe of the corneal reflex images Pd' and Pe' and the X coordinates Xa and Xb of the pupil end image a' and b'. Specifically, it is possible to obtain coordinates at which the brightness is extremely high as the coordinates of the corneal reflex images Pd' and Pe' and obtain coordinates at which the brightness is extremely low as the coordinates of the pupil end images a' and b'. Further, when a rotational angle $\theta x$ of the light axis of the eyeball 14 with respect to the light axis of the light-receiving lens 16 is small, it is possible to express a coordinate Xc of a pupil center image c' (the center of the pupil image) obtained when an image of a light flux from a pupil center c is formed on the eye imaging element 17 as $Xc \approx (Xa+Xb)/2$. That is, it is possible to calculate the coordinate Xc of the pupil center image c' from the X coordinates Xa and Xb of the pupil end images a' and b'. In the manner described above, it is possible to estimate the coordinates of the corneal reflex images Pd' and Pe' and the coordinate of the pupil central image c'.

In step S704, the CPU 3 calculates image-forming magnification β of the eye image. The image-forming magnification β is magnification determined by the position of the eyeball 14 with respect to the light-receiving lens 16. It is possible to calculate the image-forming magnification β using the function of the interval (Xd–Xe) between the corneal reflex images Pd' and Pe'.

In step S705, the CPU 3 calculates the rotational angle of the light axis of the eyeball 14 with respect to the light axis of the light-receiving lens 16. The X coordinate of the middle point between the corneal reflex images Pd and Pe almost matches the X coordinate of a curvature center O of the corneal 142. Therefore, when a normal distance from the curvature center O of the corneal 142 to a center c of the pupil 141 is defined as Oc, it is possible to calculate the rotational angle θx of the eyeball 14 within a Z-X plane (a plane perpendicular to the Y-axis) according to the following Formula 1. It is also possible to calculate a rotational angle θy of the eyeball 14 within a Z-Y plane (a plane perpendicular to the X-axis) according to the same method as that for calculating the rotational angle θx.

$$β×Oc×\text{SIN } θx≈\{(Xd+Xe)/2\}-Xc \quad \text{(Formula 1)}$$

In step S706, the CPU 3 calculates (estimates) the viewed point of the user (a gazed position; a position upon which the user is turning his/her eye) on the screen of the display device 10 using the rotational angles θx and θy calculated in step S705. When gaze position (the coordinates of a viewed point) (Hx, Hy) indicates coordinates corresponding to the pupil center c, it is possible to calculate the gaze position (Hx, Hy) according to the following Formulas 2 and 3.

$$Hx=m×(Ax×θx+Bx) \quad \text{(Formula 2)}$$

$$Hy=m×(Ay×θy+By) \quad \text{(Formula 3)}$$

The parameter m in Formulas 2 and 3 is a constant set according to the configuration of the finder optical system (such as the light-receiving lens 16) of the camera 1 and is a conversion coefficient with which the rotational angles θx and θy are converted into coordinates corresponding to the pupil center c on the screen of the display device 10. The parameter m is determined in advance and stored in the memory unit 4. The parameters Ax, Bx, Ay, and By are gaze correction parameters for correcting an individual difference in gaze and acquired through a calibration operation. The parameters Ax, Bx, Ay, and By are stored in the memory unit 4 before the gaze detection operation starts.

In step S707, the CPU 3 stores the gaze position (Hx, Hy) in the memory unit 4 and ends the gaze detection operation.

Description of AF Processing Based on Gaze Position

The camera 1 has the function of performing AF (Auto Focus) on the basis of the gaze position of a photographer. When detecting the gaze position of the photographer, the camera 1 adjusts the focal distance of the photographing lens unit 1A so that focus is achieved around the gaze position.

However, in AF processing (AF operation) based on a gaze position, there is a case that the gaze position of a photographer does not match a focus position. For example, in AF processing in which object detection is performed, the camera 1 performs the object detection around the gaze position of a photographer and focuses a detected object. However, when another object exists around the object (a region in which the gaze position has been detected) being looked by the photographer, there is a case that the camera 1 detects the other object different from the object being looked by the photographer and focuses the other object. Further, in AF processing in which object detection is not performed, the camera 1 detects a region (such as a high-contrast region) capable of being focused from the periphery of a gaze position and focuses the detected region. However, there is a case that the region capable of being focused by the camera 1 is distant from the gaze position of the photographer. An image captured in such a case may not be focused at the gaze position of the photographer.

The user (the photographer in the present embodiment) displays an image in an enlarged fashion to confirm, for example, the achievement of focus. Therefore, in the first embodiment, the camera 1 performs control to enlarge or reduce an image about a position based on gaze information on the photographer when displaying the image in an enlarged or reduced fashion. Thus, the user is allowed to easily confirm whether focus is achieved in a region noticed by the photographer.

Recording Processing

Figure 8:
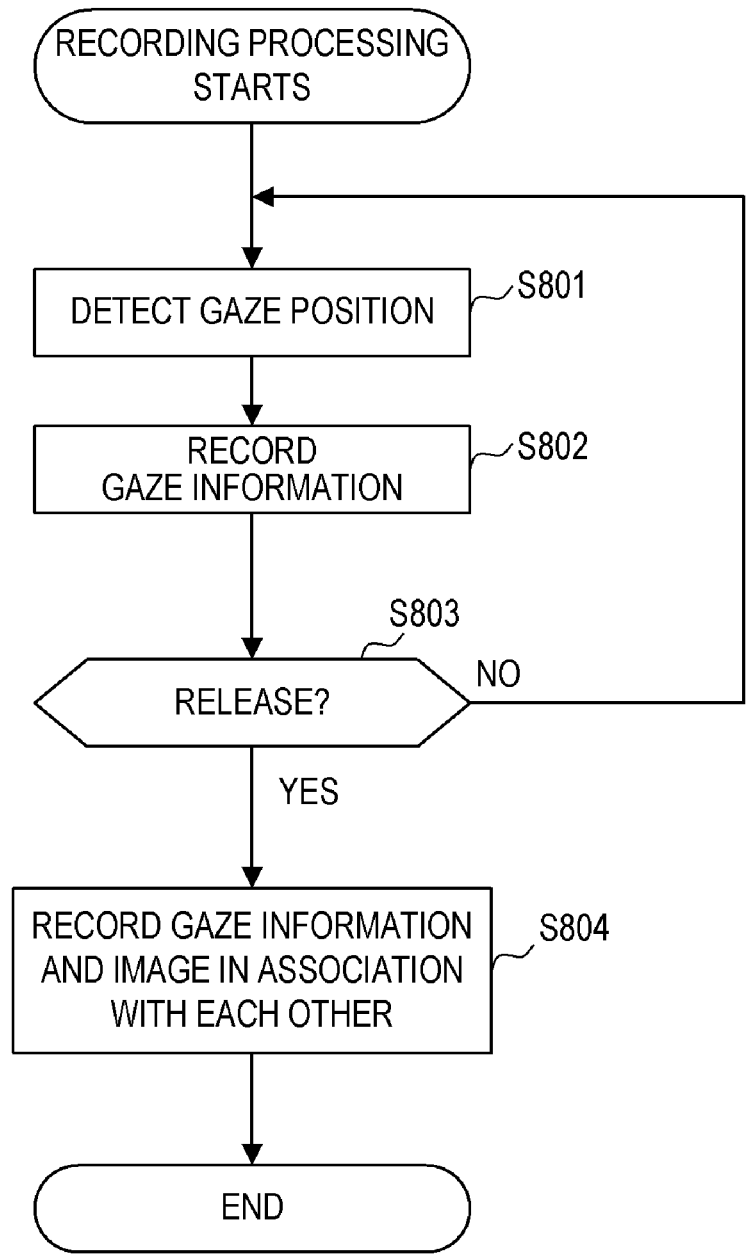
FIG. 8 is a flowchart of recording processing according to the first embodiment.

FIG. 8 is a flowchart showing recording processing to record gaze information and an image in association with each other. The recording processing will be described with reference to FIG. 8. The recording processing starts when the power of the camera 1 is turned on.

In step S801, the CPU 3 detects the gaze position of the user looking an image captured by the imaging element 2 and displayed on the display device 10.

In step S802, the CPU 3 records gaze information on the memory unit 4. The gaze information recorded on the memory unit 4 indicates the gaze position and the time at which the gaze position was detected.

In step S803, the CPU 3 determines whether release (the operation of the switch SW2) has been performed. When the release has not been performed, the CPU 3 returns to step S801 and repeatedly detects the gaze position. When the release has been performed, the CPU 3 proceeds to step S804.

Figure 9:
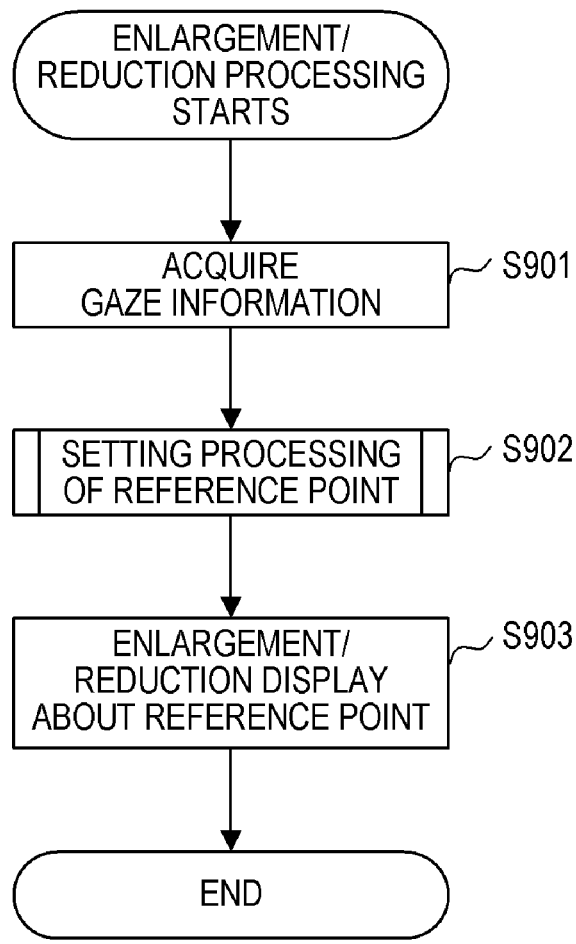
FIG. 9 is a flowchart of reproduction processing (enlargement/reduction processing) according to the first embodiment.

In step S804, the CPU 3 records the gaze information recorded on the memory unit 4 and the image captured by the imaging element 2 on the recording medium 5 in association with each other. The gaze information recorded on the recording medium 5 indicates a plurality of gaze positions detected before the release after the power of the camera 1 is turned on. The CPU 3 ends the recording processing when the power of the camera 1 is turned off Reproduction Processing Next, a part of reproduction processing to reproduce an image recorded on the recording medium 5 will be described with reference to FIG. 9. FIG. 9 is a flowchart of a part of the reproduction processing according to the first embodiment. The CPU 3 is able to control a live-view image captured by the imaging element 2 or an image recorded on the recording medium 5 so as to be displayed on the display device 10 or a rear display. The rear display is a display panel provided in the operation member 41. When receiving a signal instructing the reproduction of an image recorded on the recording medium 5, the CPU 3 reads the image from the recording medium 5 and copies the same to the memory unit 4. The CPU 3 displays the image copied to the memory unit 4 on the display device 10 or the rear display. Note that the reproduction processing may be performed by an apparatus (such as a personal computer) separate from the camera 1. The user in the reproduction processing may be the same as or different from a user in the recording processing.

FIG. 9 is a flowchart of enlargement/reduction processing to enlarge/reduce an image displayed on the display device 10 or the rear display. The enlargement/reduction processing starts when an operation (an enlargement/reduction operation) to instruct the enlargement/reduction of an image displayed on the display device 10 or the rear display is performed by the user. Note that the user is able to perform the enlargement/reduction operation using any of the operation members 41 to 43.

In step S901, the CPU 3 reads (acquires) gaze information recorded on the recording medium 5 in association with an image being displayed from the recording medium 5 and copies the same to the memory unit 4 when receiving the enlargement/reduction operation from the user. The gaze information recorded on the recording medium 5 is information indicating a plurality of gaze positions detected before release.

In step S902, the CPU 3 performs setting processing to set a central position (reference point) for enlargement or reduction on the basis of the gaze information acquired in step S901. The setting processing of a reference point will be described in detail later.

In step S903, the CPU 3 enlarges or reduces the image displayed on the display device 10 or the rear display about the reference point determined in step S902. Through the enlargement of an image about a position based on gaze information, the user is allowed to easily confirm, for example, the achievement of focus at an intended position, the good state of the facial expression of an object, or the like. The CPU 3 ends an enlargement display or a reduction display when receiving instructions to end the enlargement display or the reduction display from the user.

Setting Processing of Reference Point

Figure 10A:
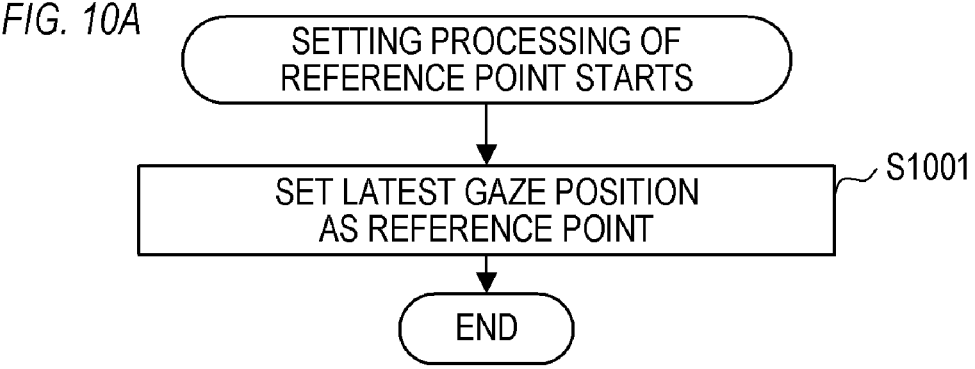

Next, the setting processing of a reference point performed in step S902 of FIG. 9 will be described in detail with reference to FIG. 10A. FIG. 10A is a flowchart showing an example of the setting processing of a reference point according to the first embodiment.

In FIG. 10A, the CPU 3 sets the latest gaze position (immediately before release) among a plurality of gaze positions indicated by gaze information acquired in step S901 as a reference point (step S1001). Note that the gaze position indicates coordinates (Hx, Hy) on the display device 10 corresponding to the center c of the pupil 141. Through the setting of the latest gaze position as a reference point, a user is allowed to easily confirm an object region noticed immediately before release.

FIG. 10B is a flowchart showing a modified example of the setting processing of a reference point according to the first embodiment. In FIG. 10B, the CPU 3 sets a reference point according to a fluctuation in gaze positions.

In step S1011, the CPU 3 calculates a fluctuation (variance) in a plurality of gaze positions (Hx, Hy) indicated by gaze information acquired in step S901. Note that values for evaluating a fluctuation in gaze positions may only be used, besides a variance. Further, the CPU 3 may calculate a fluctuation in any one of an X-coordinate and a Y-coordinate of a gaze position.

In step S1012, the CPU 3 determines whether the fluctuation calculated in step S1011 is less than a third threshold. The CPU 3 proceeds to step S1013 when the fluctuation is less than the third threshold, and proceeds to step S1014 when the fluctuation is at least the third threshold.

In step S1013, the CPU 3 acquires an average position of a plurality of gaze positions indicated by the gaze information acquired in step S901 and sets the same as a reference point. When the fluctuation in the gaze positions is less than the third threshold as described above, the CPU 3 performs control to enlarge or reduce an image about the average position of the gaze positions.

In step S1014, the CPU 3 sets the focus position of the image displayed on the display device 10 or the rear display as the reference point. Note that the CPU 3 may set the central position of the image as the reference position. For example, when the focus position of the image is acquired by an AF operation, the CPU 3 sets the focus position as the reference point. When the focus position of the image is not acquired like the case of manual focus, the CPU 3 sets the central position of the image as the reference point. When the AF operation is performed but the focus position of the image is not acquired, the CPU 3 sets the central position of the image as the reference point. When a fluctuation in gaze positions is at least the third threshold as described above, the CPU 3 performs control to enlarge or reduce an image about the focus position or the central position of the image.

Here, the effect of processing depending on a fluctuation in gaze positions will be described. The characteristic of a person eye is that the eye slightly moves (involuntary eye movement) even when gazing at one point and its gaze position is not constantly set at the same coordinates. Further, a case that the user takes a glance at another object during photographing is also assumed. Accordingly, there is a possibility that each gaze position is different from the position of an object needed to be enlarged or reduced by the user for confirmation. Further, when a fluctuation in gaze positions is larger than a predetermined value, there is a possibility that an average position of the gaze positions is different from the position of an object needed to be enlarged or reduced by the user for confirmation. Accordingly, through the setting of a reference point in consideration of a fluctuation in detected gaze positions, it is possible to increase a probability that the position of an object needed to be enlarged or reduced by the user for confirmation equals the reference point.

FIG. 10C is a flowchart showing a modified example of the setting processing of a reference point according to the first embodiment. Here, it is assumed that an image recorded on the recording medium 5 is displayed on the display device 10. Further, it is assumed that a gaze detection operation is performed to acquire gaze information while the user looks an image displayed on the display device 10 (an image recorded on the recording medium 5). The setting processing of FIG. 10C includes processing in which gaze information (current gaze information) on the user looking the display device 10 is used.

In step S1021, the CPU 3 determines whether gaze information recorded on the memory unit 4 is set to be used. Using the operation members 41 to 43, the user is allowed to make settings as to whether the gaze information recorded on the memory unit 4 is used. The CPU 3 proceeds to step S1022 when the gaze information recorded on the memory unit 4 is set to be used. The CPU 3 proceeds to step S1023 when the gaze information recorded on the memory unit 4 is set not to be used.

In step S1022, the CPU 3 sets a reference point on the basis of the gaze information recorded on the memory unit 4. For example, the CPU 3 sets the reference point according to the method shown in FIG. 10A or FIG. 10B.

In step S1023, the CPU 3 determines whether the user is in contact with the eyepiece 12. The determination as to whether the user is in contact with the eyepiece 12 is made according to, for example, whether an eye image capturing the eye of the user has been acquired. The CPU 3 determines that the user is in contact with the eyepiece 12 and proceeds to step S1024 when the eye image has been acquired. The CPU 3 determines that the user is separated from the eyepiece 12 and proceeds to step S1025 when the eye image has not been acquired. Note that the CPU 3 may perform control to transition to step S1023 of FIG. 10C when determining in the processing of step S1012 of FIG. 10B that a fluctuation is at least the third threshold.

In step S1024, the CPU 3 sets a position based on gaze information on the user looking the image displayed on the display device 10 (for example, a gaze position indicated by the current gaze information) as the reference point. When the gaze information is acquired in a state in which the gaze information recorded on the memory unit 4 is set not to be used as described above, the CPU 3 performs control to enlarge or reduce the image about the position based on the gaze information. With this control, the user is allowed to easily confirm an object region currently noticed by the user himself/herself in an image displayed on the display device 10.

In step S1025, the CPU 3 sets the focus position of the image displayed on the display device 10 as the reference point. Note that the CPU 3 may set the central position of the image as the reference point like step S1014 of FIG. 10B. When the gaze information is not acquired in a state in which the gaze information recorded on the memory unit 4 is set not to be used as described above, the CPU 3 performs control to enlarge or reduce an image about the focus position or the central position of the image.

Note that gaze information indicating a plurality of gaze information is recorded in the first embodiment. However, one gaze position may be recorded and set as a reference point. Thus, it is possible to enlarge or reduce an image in simpler processing.

As described, the camera 1 performs display control to enlarge or reduce an image about a position based on gaze information recorded on the recording medium 5 when enlarging or reducing the image recorded on the recording medium 5 in the first embodiment. Thus, the user is allowed to easily confirm, for example, the achievement of focus at a position intended by the user (photographer) or the like and reduce time and effort for selecting an image.

Second Embodiment

Figure 11:
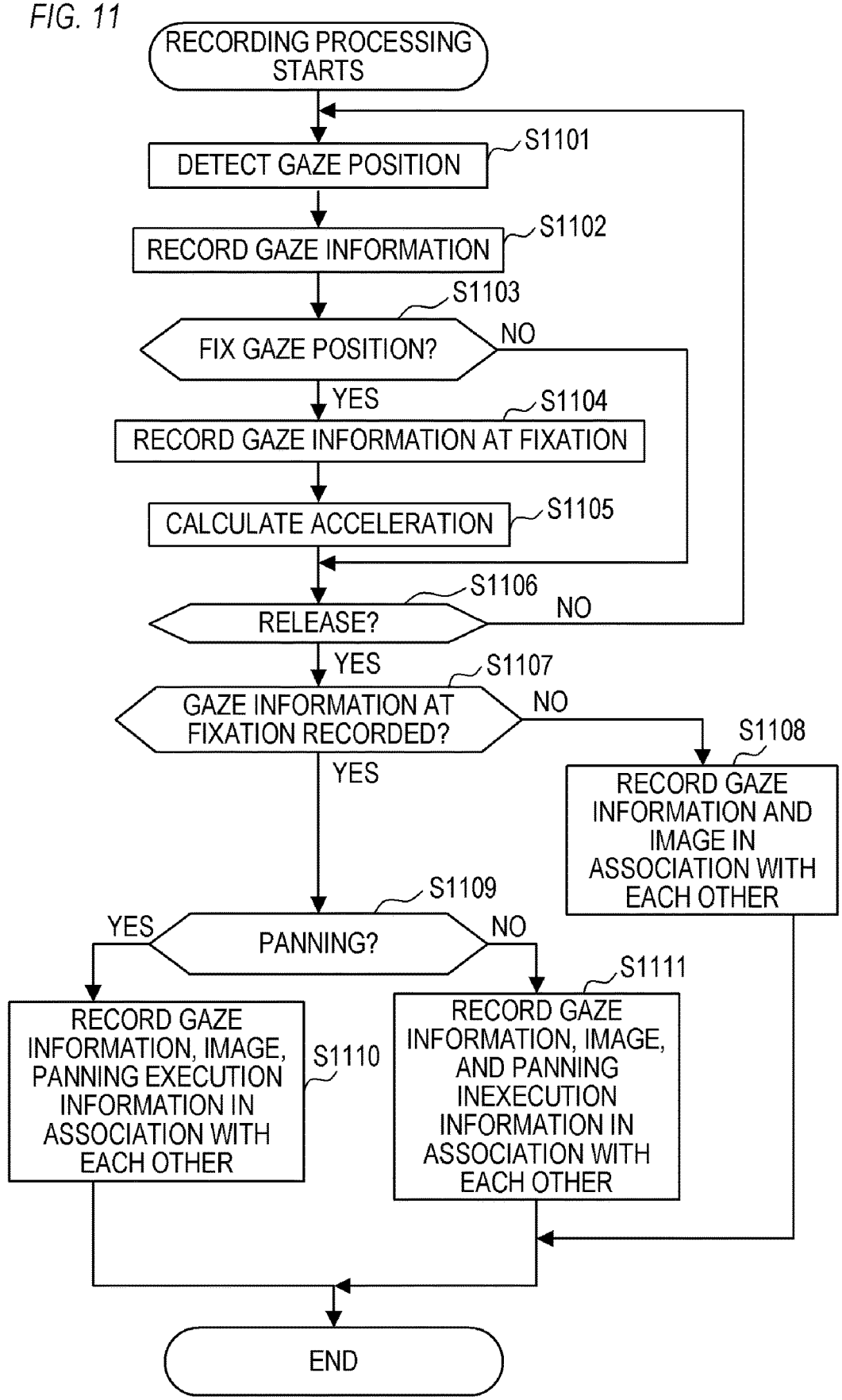
FIG. 11 is a flowchart of recording processing according to a second embodiment.

In a second embodiment, a camera 1 has the reception function of receiving instructions to fix a gaze position from a user unlike the first embodiment. In addition, recording processing according to the second embodiment includes processing to determine whether a captured image satisfies a predetermined condition. Hereinafter, a point different from that of the first embodiment will be mainly described.
Recording Processing The recording processing according to the second embodiment will be described with reference to FIG. 11. FIG. 11 is a flowchart showing the recording processing according to the second embodiment. The recording processing starts when the power of the camera 1 is turned on. The processing of steps S1101 and S1102 is the same as that of steps S801 and S802 of FIG. 8.

In step S1103, a CPU 3 determines whether instructions to fix a gaze position have been received from the user. The CPU 3 proceeds to step S1104 when the instructions to fix the gaze position have been received. The CPU 3 proceeds to step S1106 when the instructions to fix the gaze position have not been received.

Here, the function of fixing a gaze position will be described. A release button 5 is constituted as a two-step type pressing switch. The user is allowed to instruct an AF operation by a first stroke, or a so-called half-pressing (switch SW1) operation and perform release by a second stroke, or a so-called full-pressing (switch SW2) operation. Further, the release button 5 has the reception function of receiving instructions to fix a gaze position (gaze position fixation) at a specific position from the user. The user is allowed to fix a gaze position by, for example, the switch SW1 operation and instruct an AF operation on the basis of the fixed position. Note that the operation of fixing a gaze position is assigned to the switch SW1 operation in the second embodiment but may be assigned to the operation of operation members 41 to 43.

In step S1104, the CPU 3 records gaze information at the fixation of the gaze position in step S1103 on the memory unit 4. The gaze information at the fixation of the gaze position indicates the gaze position acquired when the CPU 3 has received instructions to fix the gaze position from the user and the time at which the CPU 3 has detected the gaze position. Note that the CPU 3 continues to perform a gaze detection operation even after receiving the instructions to fix the gaze position and records a plurality of gaze information including gaze positions other than the fixed position on the memory unit 4. The plurality of gaze information is recorded on the memory unit 4 so that the gaze information at the fixation of the gaze position is discriminable.

In step S1105, the CPU 3 calculates the acceleration of the camera 1 by at least any of an acceleration sensor 6 included in a camera housing 1B and an acceleration sensor 119 included in a photographing lens unit 1A and records the same on a memory unit 4.

In step S1106, the CPU 3 determines whether release (the switch SW2 operation) has been performed. The CPU 3 returns to step S1101 and repeatedly performs the detection of a gaze position and the recording of gaze information when the release has not been performed. The CPU 3 proceeds to step S1107 when the release has been performed. Note that when the recording of gaze information is repeatedly performed, the CPU 3 records the gaze information in different regions of the memory unit 4 and records the gaze information indicating a plurality of positions. Note that the CPU 3 may update and record the gaze information in the same region of the memory unit 4.

In step S1107, the CPU 3 determines whether the gaze information at the fixation of the gaze position is recorded on the memory unit 4. The CPU 3 proceeds to step S1108 when the gaze information at the fixation of the gaze position is not recorded on the memory unit 4, that is, when the CPU 3 has not received the instructions to fix the gaze position in step S1103. The CPU 3 proceeds to step S1109 when the gaze information at the fixation of the gaze position is recorded on the memory unit 4, that is, when the CPU has received the instructions to fix the gaze position in step S1103.

In step S1108, the CPU 3 records the gaze information recorded on the memory unit 4 and an image captured by an imaging element 2 on a recording medium 5 in association with each other.

In step S1109, the CPU 3 determines whether the captured image satisfies a predetermined condition. In the recording processing shown in FIG. 11, the predetermined condition is satisfied when the movement of the camera 1 is larger than a first threshold at the capturing of the image. The movement of the camera 1 is calculated on the basis of average acceleration or instantaneous acceleration before the release in step S1106 after the CPU 3 has received the instructions to fix the gaze position in step S1103. When at least any one of the average acceleration and the instantaneous acceleration is larger than the first threshold, the CPU 3 determines that panning has been executed (the predetermined condition is satisfied) and proceeds to step S1110. When both the average acceleration and the instantaneous acceleration are not more than the first threshold, the CPU 3 determines that the panning has not been executed (the predetermined condition is not satisfied) and proceeds to step S1111. Here, a case that the instantaneous acceleration is larger than the first threshold is, for example, a case that a timing at which the instantaneous acceleration is larger than the first threshold exists in a period from the fixation of the gaze position to the release. The case that the instantaneous acceleration is larger than the first threshold may be a case that a period longer than a predetermined length in which the instantaneous acceleration is larger than the first threshold exists in the period from the fixation of the gaze position to the release.

In step S1110, the CPU 3 records the gaze information, the captured image, and determination information indicating whether the image satisfies the predetermined condition on the recording medium 5 in association with each other. In step S1110, the CPU 3 records panning execution information that is information indicating that the panning has been executed (the predetermined condition is satisfied) on the recording medium 5. The gaze information recorded in step S1110 may or may not include the gaze information at the fixation of the gaze position.

In step S1111, the CPU 3 records the gaze information, the captured image, and the determination information on the recording medium 5 in association with each other. In step S1111, the CPU 3 records panning in execution information indicating that the panning has not been executed (the predetermined condition is not satisfied) as the determination information. The gaze information recorded in step S1111 includes the gaze information at the fixation of the gaze. When completing recording on the recording medium 5 by the processing of any of steps S1108, S1110, and S1111, the CPU 3 ends the recording processing.

Setting Processing of Reference Point

Figure 12A:
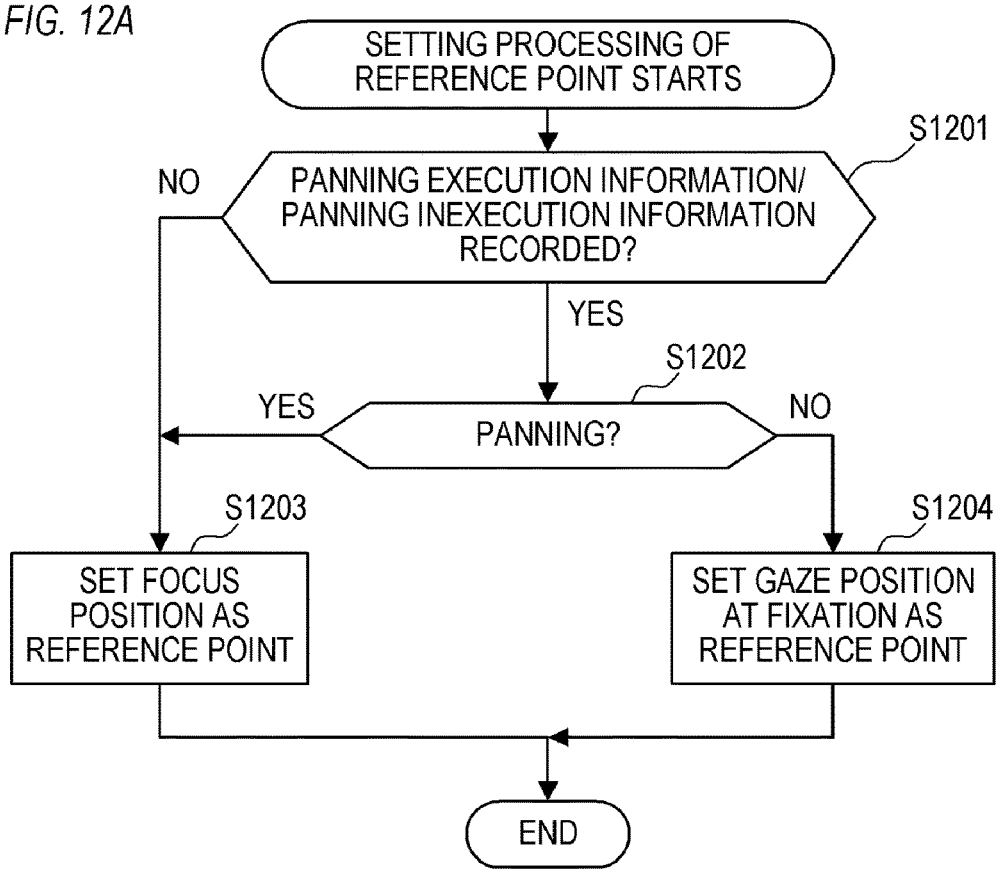
FIGS. 12A and 12B are flowcharts of the setting processing of a reference point according to the second embodiment.

Since the reproduction processing of an image read from the recording medium 5 in the second embodiment is the same as the reproduction processing shown in FIG. 9 in the first embodiment, its description will be omitted. Next, the setting processing of a reference point performed in step S902 of FIG. 9 when a recorded image is reproduced by the recording processing shown in FIG. 11 will be described in detail with reference to FIG. 12A. FIG. 12A is a flowchart showing an example of the setting processing of a reference point according to the second embodiment.

In step S1201 of FIG. 12A, the CPU 3 determines whether determination information (panning execution information or panning in execution information) is recorded on the recording medium 5 in association with an image displayed on a display device 10 or a rear display. The CPU 3 reads the determination information from the recording medium 5 and proceeds to step S1202 when the determination information is recorded. The CPU 3 proceeds to step S1203 when the determination information is not recorded. Note that the CPU 3 may determine whether gaze information at the fixation of a gaze position is recorded on the recording medium 5 in association with the image in step S1201.

In step S1202, the CPU 3 determines whether the determination information read from the recording medium 5 is panning execution information or panning in execution information. The CPU 3 proceeds to step S1203 when the determination information is the panning execution information. The CPU 3 proceeds to step S1204 when the determination information is the panning in execution information.

In step S1203, the CPU 3 sets the focus position of the image displayed on the display device 10 or the rear display as a central position (reference point) for enlargement or reduction. Note that the CPU 3 may set the central position of the image as the reference point like step S1014 of FIG. 10B. Here, when panning was executed before release after the CPU 3 has received instructions to fix the gaze position, there is a possibility that an object noticed by the user at the fixation of the gaze position is not recorded in the image. When panning was executed before release as described above, there is a possibility that a gaze position at the fixation of the gaze position is different from the position of an object needed to be enlarged or reduced by the user for confirmation. Accordingly, the CPU 3 sets, when panning execution information is recorded in association with an image, the focus position or the central position of the image as a reference point instead of a gaze position at the fixation of the gaze position.

In step S1204, the CPU 3 sets the gaze position at the fixation of the gaze position in step S1103 as the reference point. As described above, when panning in execution information is recorded in association with an image, the CPU 3 performs control to enlarge or reduce the image about a gaze position when receiving instructions to specify (fix the gaze position). Thus, the user is allowed to easily confirm an object region in which the photographer has fixed a gaze position.

Figure 12B:
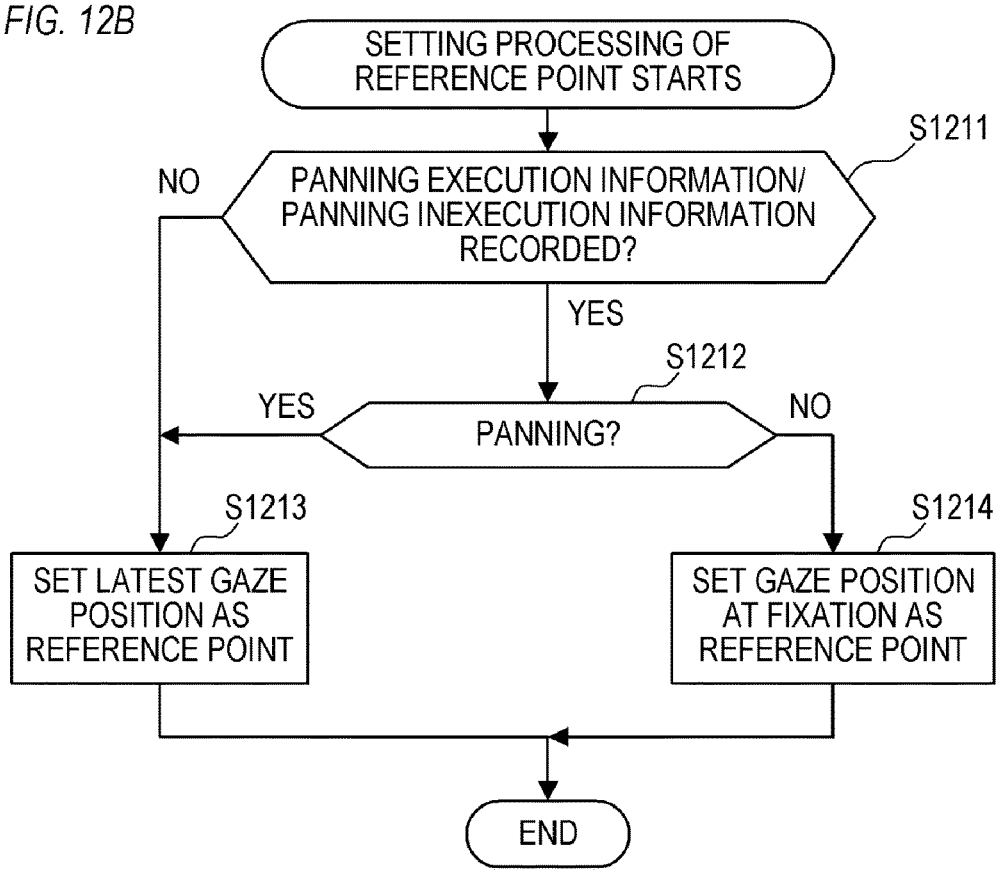

FIG. 12B is a modified example of the setting processing of a reference point. The processing of steps S1211, S1212, and S1214 of FIG. 12B is the same as that of steps S1201, S1202, and S1204 of FIG. 12A.

In step S1213, the CPU 3 sets the latest gaze position among a plurality of gaze positions indicated by gaze information acquired in step S901 as a reference point. As described above, the CPU 3 may set the latest gaze position as a reference point when panning execution information is recorded in association with an image.

Note that the CPU 3 may set a reference point according to the method shown in FIG. 10A or FIG. 10B. For example, there is a case that the CPU 3 determines from gaze information recorded in association with an image displayed on the display device 10 or the rear display that panning was executed before a specific time but was not executed after the specific time. In such a case, the CPU 3 may set a reference point according to the method shown in FIG. 10A or FIG. 10B with gaze information in a period after the specific time (a period in which panning was not executed) as a target.

Recording Processing

Figure 13:
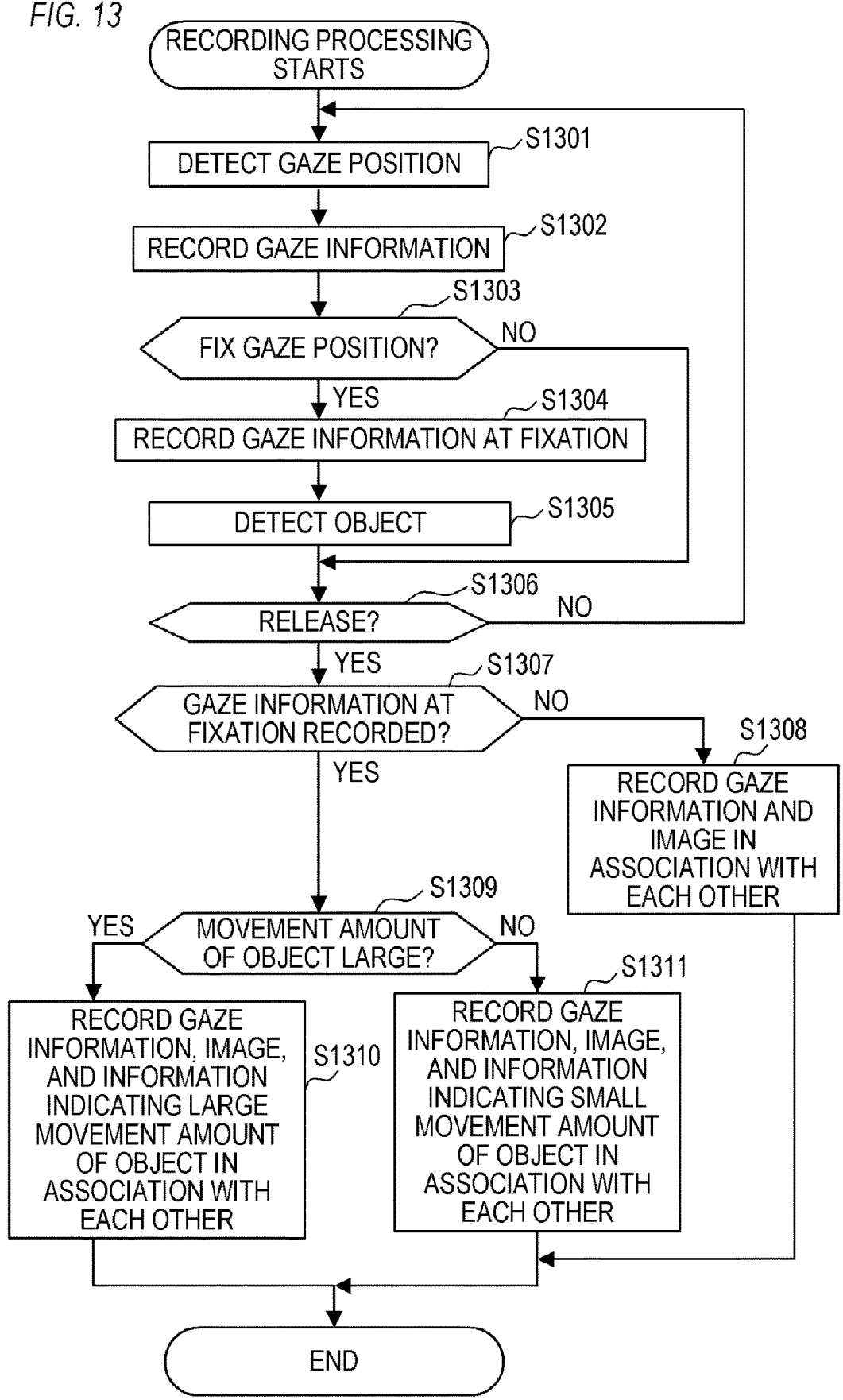
FIG. 13 is a flowchart of a modified example of the recording processing according to the second embodiment.

Next, a modified example of the recording processing according to the second embodiment will be described with reference to FIG. 13. FIG. 13 is a flowchart of the recording processing. The processing of steps S1301 to S1304 and steps S1306 to S1308 of FIG. 13 is the same as that of steps S1101 to S1104 and steps S1106 to S1108 of FIG. 11.

In step S1305, the CPU 3 detects an object (such as a face and a human body) from a region around the gaze position fixed in step S1303 using an image processing circuit 207. The CPU 3 continues the detection of the object until release and records the position of the detected object (coordinates on the display device 10 or the rear display) on the memory unit 4. Note that when once receiving the operation of fixing a gaze position and then receiving the operation of fixing the gaze position at a new position after cancellation processing, the CPU 3 may detect an object in a region around the new position. When not receiving the operation of fixing a gaze position, the CPU 3 may or may not detect an object.

In step S1309, the CPU 3 determines whether the captured image satisfies a predetermined condition. In the recording processing shown in FIG. 13, the predetermined condition is satisfied when the movement (movement amount) of the object when the image is captured is larger than a second threshold. The movement amount of the object is calculated on the basis of the movement amount (movement distance) of the object before release in step S1306 after the CPU 3 has received instructions to fix the gaze position in step S1303. The CPU 3 determines that the movement amount is large (the predetermined condition is satisfied) and proceeds to step S1310 when the movement amount of the object is larger than the second threshold. The CPU 3 determines that the movement amount is small (the predetermined condition is not satisfied) and proceeds to step S1311 when the movement amount of the object is not more than the second threshold. Note that the CPU 3 may change the second threshold according to a field angle, that is, the focal distance of an attached photographing lens unit 1A.

In step S1310, the CPU 3 records the gaze information, the captured image, and determination information on the recording medium 5 in association with each other. In step S1310, the CPU 3 records information indicating that the movement amount of the object is large as the determination information. The gaze information recorded in step S1310 may or may not include the gaze information at the fixation of the gaze position.

In step S1311, the CPU 3 records the gaze information, the captured image, and the determination information on the recording medium 5 in association with each other. In step S1311, the CPU 3 records information indicating that the movement amount of the object is small as the determination information. The gaze information recorded in step S1311 includes the gaze information at the fixation of the gaze. When completing recording by the processing of any of steps S1308, S1310, and S1311, the CPU 3 ends the recording processing.

Setting Processing of Reference Point

Figure 14A:
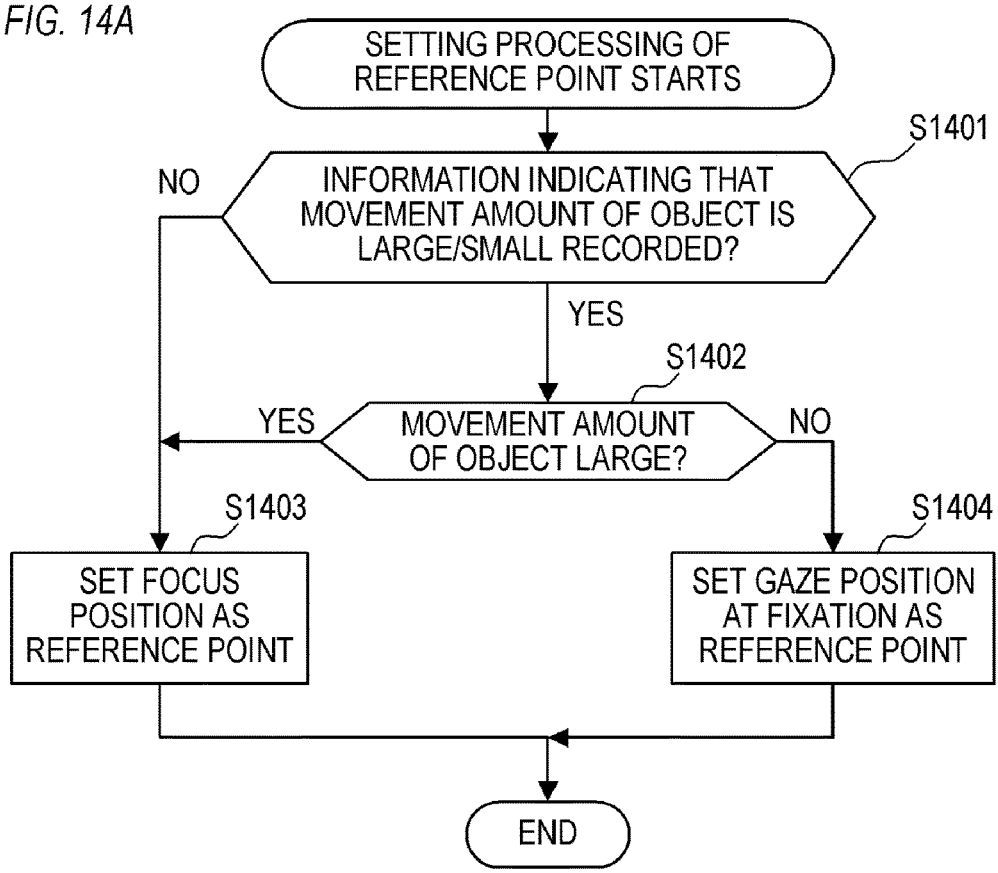
FIGS. 14A and 14B are flowcharts of the setting processing of a reference point according to the second embodiment.
Figure 14B:
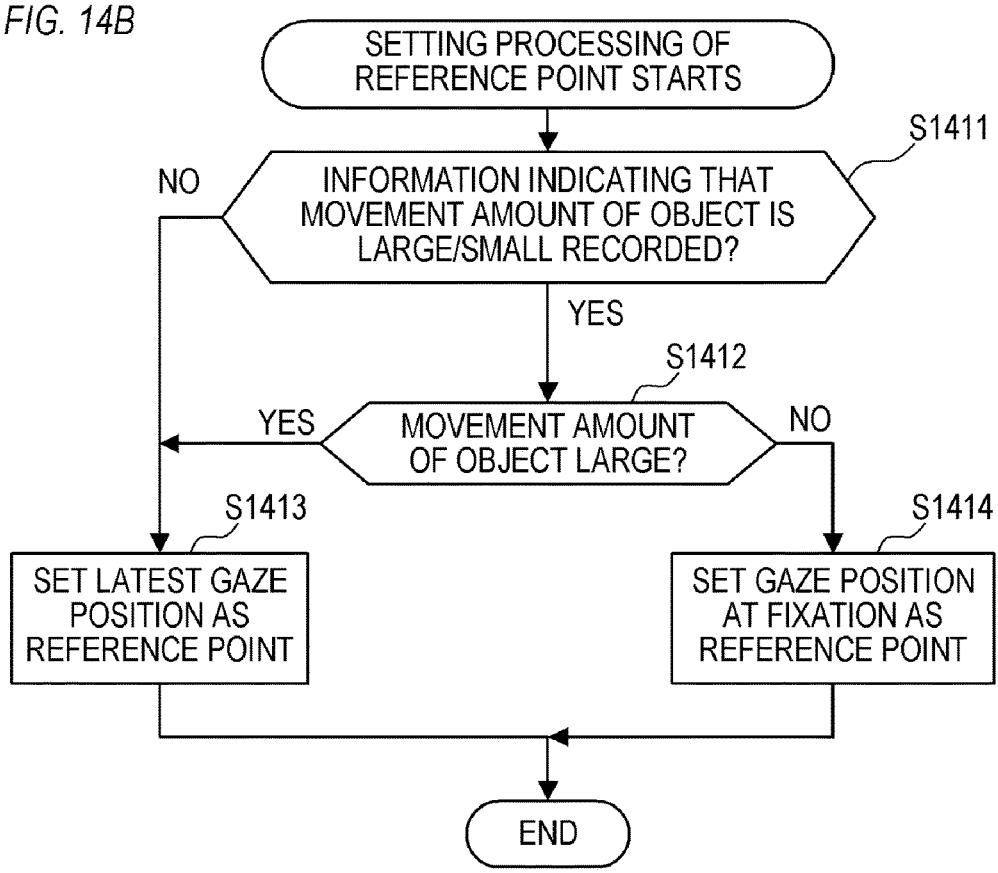

Next, the setting processing of a reference point performed in step S902 of FIG. 9 when an image recorded by the recording processing shown in FIG. 13 is reproduced will be described in detail with reference to FIGS. 14A and 14B. FIGS. 14A and 14B are flowcharts showing an example of the setting processing of a reference point according to the second embodiment. Note that the processing of steps S1403 and S1404 of FIG. 14A is the same as that of steps S1203 and S1204 of FIG. 12A, and the processing of steps S1413 and S1414 of FIG. 14B is the same as that of steps S1213 and S1214 of FIG. 12B. Further, the processing of steps S1411 and S1412 of FIG. 14B is the same as that of steps S1401 and S1402 of FIG. 14A.

In step S1401 of FIG. 14A, the CPU 3 determines whether determination information (information indicating that the movement amount of an object is large or small) is recorded on the recording medium 5 in association with an image displayed on the display device 10 or the rear display. The CPU 3 proceeds to step S1402 when the determination information is recorded, and proceeds to step S1403 when the determination information is not recorded. Note that the CPU 3 may determine in step S1401 whether gaze information at the fixation of a gaze position is recorded on the recording medium 5 in association with the image.

In step S1402, the CPU 3 determines whether the determination information read from the recording medium 5 is information indicating that the movement amount of an object is large or information indicating that the movement amount is small. The CPU 3 proceeds to step S1403 when the determination information is the information indicating that the movement amount of the object is large, and proceeds to step S1404 when the determination information is the information indicating that the movement amount of the object is small.

As shown in FIGS. 14A and 14B, the CPU 3 sets a gaze position at the fixation of the gaze position as a reference point when the movement amount of an object is smaller than a second threshold. On the other hand, the CPU 3 sets the focus position of an image, the central position of the image, or the latest gaze position as the reference point when the movement amount of the object is larger than the second threshold. This is because there is a possibility that the gaze position at the fixation of the gaze position is different from the position of the object needed to be enlarged or reduced by the user for confirmation when the object largely moves before release after the CPU 3 has received instructions to fix the gaze position.

In the second embodiment, the CPU 3 determines whether an image satisfies a predetermined condition when recording the image on the recording medium 5 and records a determination result and the image on the recording medium 5 in association with each other. Note that the CPU 3 may determine whether the image satisfies the predetermined condition when reproducing the image. For example, when a reference point is set according to the movement of a camera 1 at capturing of an image, the CPU 3 records information on acceleration and the image on the recording medium 5 in association with each other. The CPU 3 may determine whether the movement of an imaging device is larger than a first threshold on the basis of the information on acceleration recorded on the recording medium 5 when reproducing an image and set the reference point according to a determination result.

As described above, in the second embodiment, the camera 1 performs control to enlarge or reduce an image about the focus position of the image, the central position of the image, or the latest gaze position in a case in which the image satisfies a predetermined condition when enlarging or reducing the image recorded on the recording medium 5. In a case in which the image does not satisfy the predetermined condition, the camera 1 performs control to enlarge or reduce the image about a gaze position obtained when receiving instructions to fix a gaze position from the user. Thus, the user is allowed to more easily confirm the achievement of focus at a position intended by the user (photographer) or the like.

Third Embodiment

The first and second embodiment describe the processing to enlarge or reduce an image recorded on the recording medium 5. A third embodiment will describe processing to enlarge or reduce an image (a live-view image, an image expressing an object in real time) captured by an imaging element 2.

Reproduction Processing

A part of reproduction processing to reproduce a live-view image captured by the imaging element 2 will be described with reference to FIG. 15. In the third embodiment, it is assumed that a live-view image is displayed on a display device 10. FIG. 15 is a flowchart of a part of the reproduction processing according to the third embodiment and is a flowchart of enlargement/reduction processing to enlarge or reduce a live-view image. The enlargement/reduction processing starts when the operation of instructing (enlargement/reduction operation) the enlargement or reduction of a live-view image displayed on the display device 10 is performed by a user.

In step S1501, a CPU 3 detects the gaze position of the user looking a live-view image captured by the imaging element 2 and displayed on the display device 10 and acquires gaze information.

In step S1502, the CPU 3 performs setting processing to set a reference point (central position) for enlargement or reduction on the basis of the gaze information acquired in step S1501. The setting processing of a reference point will be described in detail later.

In step S1503, the CPU 3 enlarges or reduce the image displayed on the display device 10 about the reference point determined in step S1502. Through the enlargement of an image about a position based on gaze information, the user is allowed to easily confirm, for example, the achievement of focus at an intended position, the good state of the facial expression of an object, or the like before release. When receiving instructions to end an enlargement display or a reduction display from the user, the CPU 3 ends the enlargement display or the reduction display.

Setting Processing of Reference Point

Figure 16A:
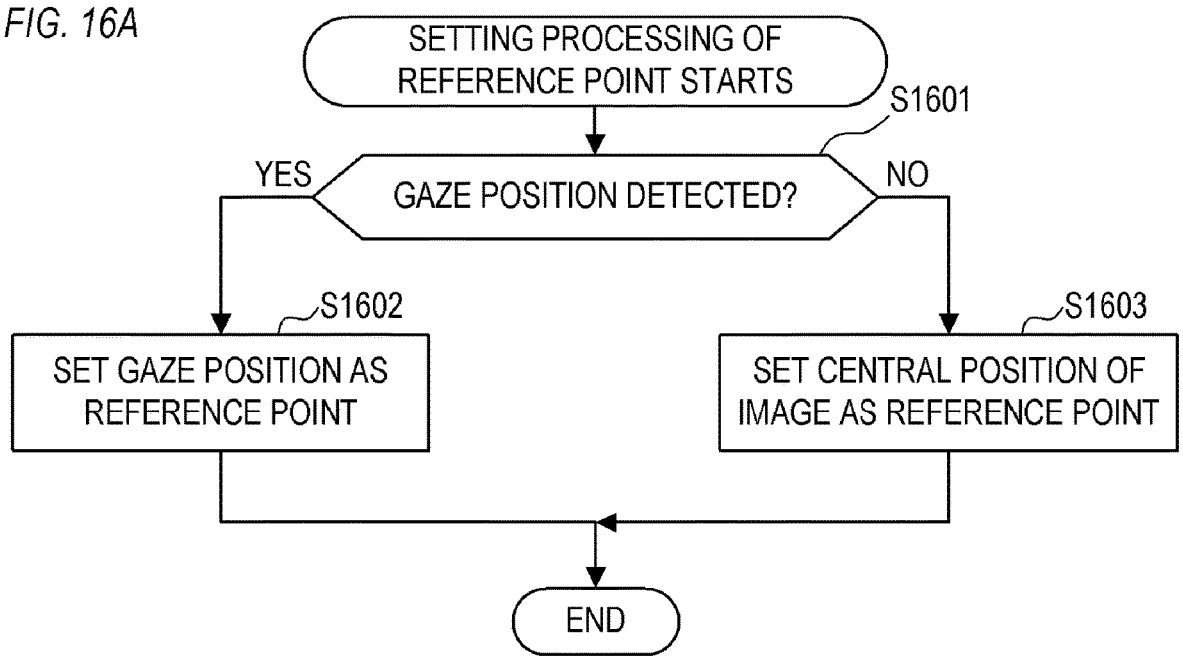
FIGS. 16A and 16B are flowcharts of the setting processing of a reference point according to the third embodiment.

Next, the setting processing of a reference point performed in step S1502 of FIG. 15 will be described in detail with reference to FIG. 16A. FIG. 16A is a flowchart showing an example of the setting processing of a reference point according to the third embodiment. Here, it is assumed that a gaze detection operation is performed before the reception of an enlargement/reduction operation and that gaze information is recorded on a memory unit 4 during a period in which the user looks a live-view image displayed on the display device 10.

In step S1601 of FIG. 16A, the CPU 3 determines whether a gaze position has been correctly detected in step S1501. The determination as to whether the gaze position has been correctly detected in step S1501 is made by, for example, the comparison between at least one gaze position (previous gaze position) before an enlargement/reduction operation and the gaze position acquired in step S1501. The previous gaze position may be, for example, a gaze position detected at a predetermined timing before the enlargement/reduction operation is received. The CPU 3 determines that the gaze position has been correctly detected when the deviation between the previous gaze position and the gaze position acquired in step S1501 is not more than a predetermined threshold, and determines that the gaze position has not been correctly detected when the deviation is larger than the predetermined threshold. The CPU 3 proceeds to step S1602 when the gaze position has been correctly detected, and proceeds to step S1603 when the gaze position has not been correctly detected.

Note that the CPU 3 may determine in step S1601 whether a gaze position has been detected in step S1501. The determination as to whether the gaze position has been detected is made by, for example, the detection of corneal reflex images Pd and Pe in step S1501, the calculation of a pupil center c, or the like. As described above, the CPU 3 may branch off the processing without relying on comparison with a previous gaze position. The CPU 3 proceeds to step S1602 when the gaze position has been detected, and proceeds to step S1603 when the gaze position has not been detected.

In step S1602, the CPU 3 sets a gaze position indicated by gaze information acquired in step S1501 as a central position (reference position) for enlargement or reduction. As described above, the CPU 3 performs control to enlarge or reduce an image about a position (for example, a gaze position indicated by current gaze information) based on gaze information on the user looking the image displayed on the display device 10. With this control, the user is allowed to easily confirm an object region currently noticed by the user himself/herself in an image displayed on the display device 10. Note that the CPU 3 may set, for example, an average position of gaze positions in a predetermined period as a reference point on the basis of acquired gaze information.

In step S1603, the CPU 3 sets the central position of the image displayed on the display device 10 as the reference point. When determining in step S1601 that the gaze position has not been correctly detected, the CPU 3 sets the central position of the image as the reference point to thereby make it possible to prevent the image from being enlarged or reduced about a region not intended by the user. Note that the CPU 3 may set the focus position of the image as the reference point when the focus position of the image is acquired in step S1603.

Figure 16B:
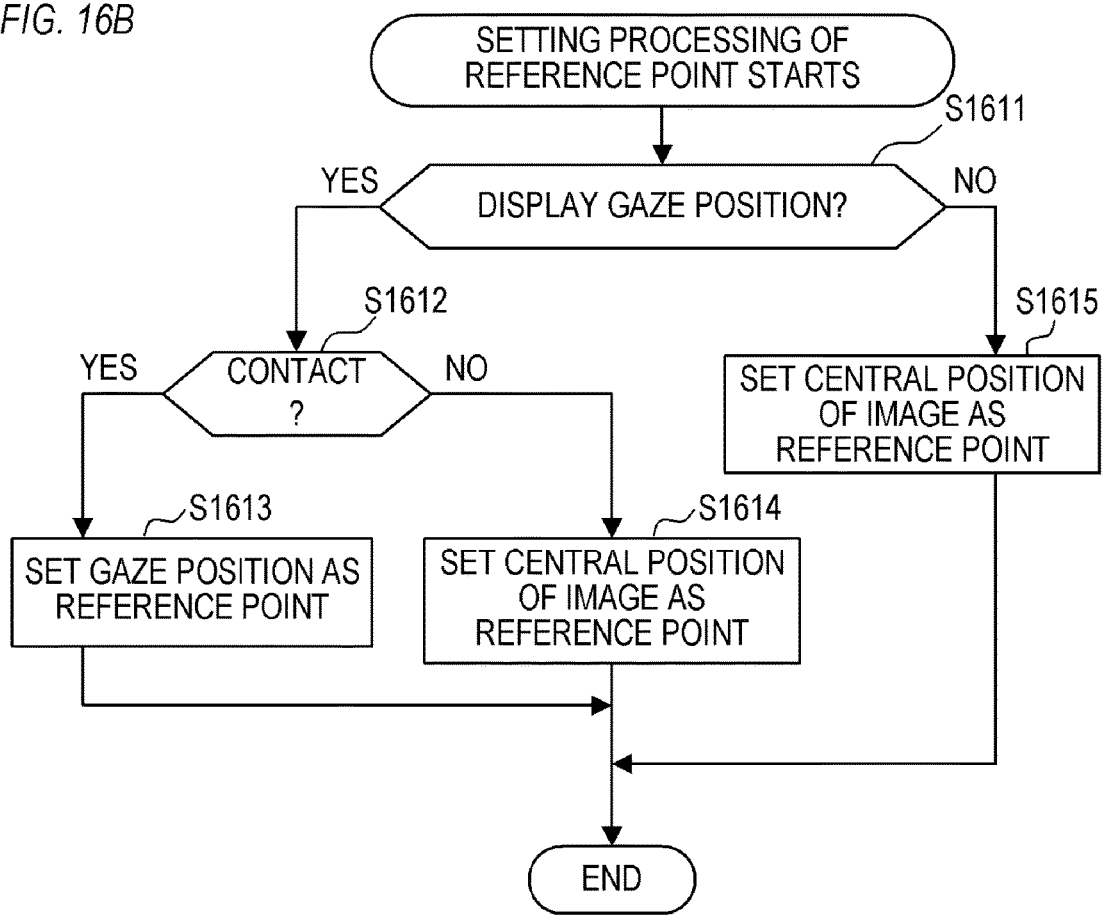

FIG. 16B is a modified example of the setting processing of a reference point. In step S1611, the CPU 3 determines whether a gaze position detected by a gaze detection operation is set to be displayed on the display device 10. Note that the user is allowed to make settings as to whether the gaze position is displayed using operation members 41 to 43 of the user. Further, the gaze position may be displayed on the display device 10 by, for example, a gaze pointer or the like when the gaze position is displayed. The CPU 3 proceeds to step S1612 when the gaze position is set to be displayed, and proceeds to step S1615 when the gaze position is set not to be displayed.

In step S1612, the CPU 3 determines whether the user is in contact with an eyepiece 12. The determination as to whether the user is in contact with the eyepiece 12 is made by, for example, the acquisition of an eye image of the user. The CPU 3 proceeds to step S1613 when determining that the user is in contact with the eyepiece, and proceeds to step S1614 when determining that the user is separated from the eyepiece. Note that the CPU 3 may determine in step S1612 whether the gaze position has been correctly detected in step S1501 like step S1601.

In step S1613, the CPU 3 sets the gaze position indicated by gaze information acquired in step S1501 as a reference point.

In step S1614, the CPU 3 sets the central position of an image displayed on the display device 10 as the reference point. Similarly, in step S1615, the CPU 3 sets the central position of the image displayed on the display device 10 as the reference point. Note that the CPU 3 may set the focus position of the image as the reference point when the focus position of the image is acquired in steps S1614 and S1615.

Here, the effect of processing depending on whether a gaze position is displayed will be described. In a case in which a gaze position is not displayed on the display device 10 by a gaze pointer or the like, the user does not understand a central position for enlargement or reduction when an image is enlarged or reduced about a position based on gaze information and possibly has a sense of discomfort. Therefore, when a gaze position is set not to be displayed, the CPU 3 performs control to enlarge or reduce an image about, for example, the central position of the image rather than a position based on gaze information. Thus, it is possible to reduce a sense of discomfort.

Note that the third embodiment describes the processing to enlarge or reduce a live-view image displayed on the display device 10. However, the present invention may be applied to processing to enlarge or reduce a live-view image displayed on a rear display. For example, when the user changes a display on the display device 10 to a display on the rear display in the middle of photographing, the CPU 3 performs control to enlarge or reduce a live-view image on the basis of gaze information displayed on the display device 10. Thus, the user is allowed to display a region having been noticed by the user on the display device 10 on the rear display and confirm the same.

In the third embodiment, the camera 1 performs control to enlarge or reduce a live-view image about a position based on gaze information on the user (photographer) looking the live-view image when enlarging or reducing the live-view image captured by the imaging element 2. Thus, the user is allowed to easily confirm the achievement of the focus of a live-view image or the like.

Fourth Embodiment

Unlike the first to third embodiments, recording processing according to a fourth embodiment includes processing to perform the rating of a focus degree with respect to an image recorded on a recording medium 5. Thus, a user is allowed to easily confirm the achievement of focus when confirming an image recorded on the recording medium 5.

Recording Processing

Figure 17:
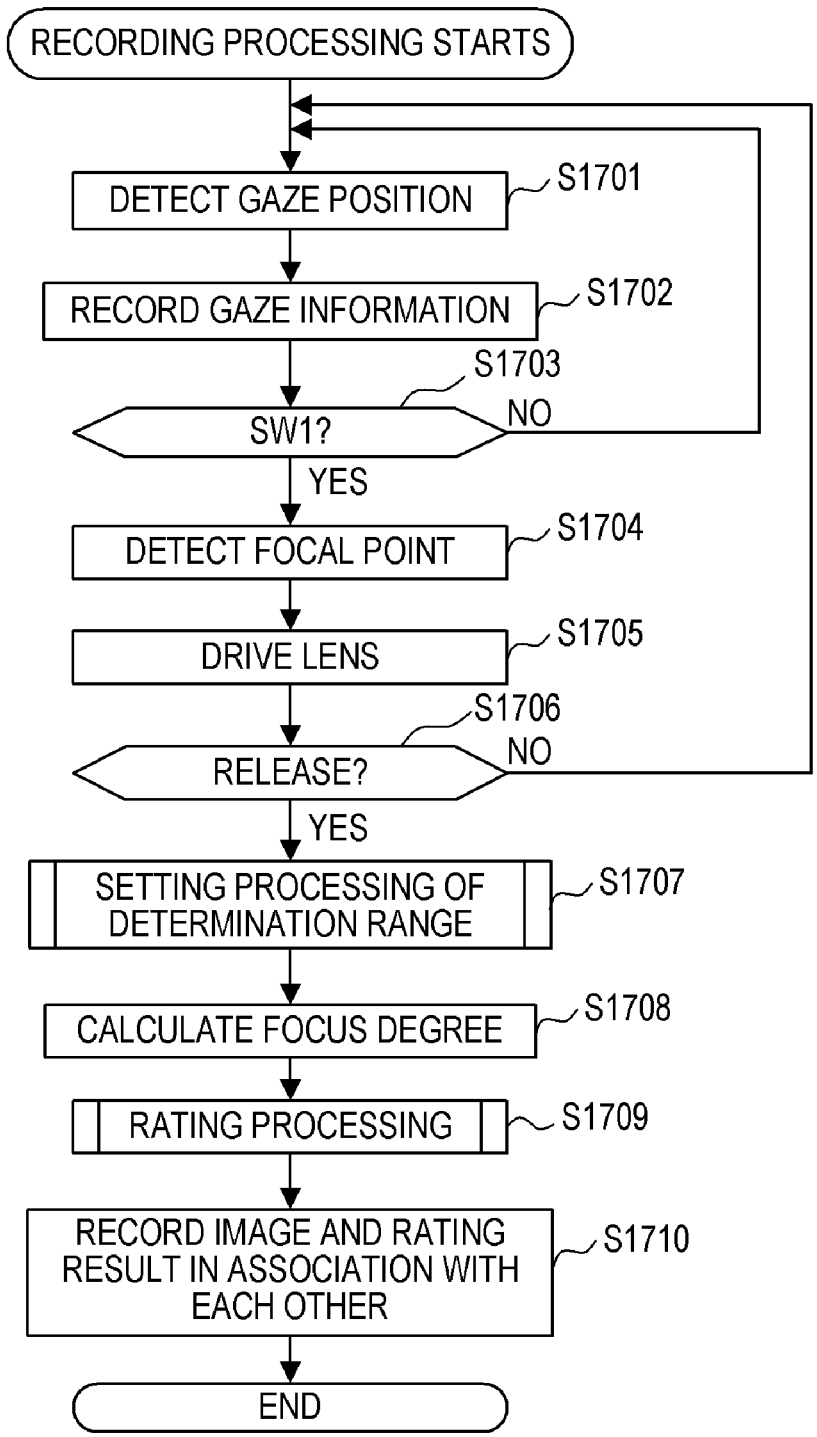
FIG. 17 is a flowchart of recording processing according to a fourth embodiment.

The recording processing according to the fourth embodiment will be described with reference to FIG. 17. FIG. 17 is a flowchart of the recording processing according to the fourth embodiment. The recording processing starts when the power of a camera 1 is turned on. The processing of steps S1701 and S1702 is the same as that of steps S801 and S802 of FIG. 8.

In step S1703, a CPU 3 determines whether instructions to perform an AF operation have been received (whether the switch SW1 operation of a release button 5 has been performed). When the switch SW1 operation has not been performed, the CPU 3 returns to step S1701 and repeatedly performs the detection of a gaze position and the recording of gaze information. The CPU 3 proceeds to step S1704 when the switch SW1 operation has been performed.

In step S1704, the CPU 3 performs focal detection to detect a distance to an object detected on the basis of the gaze information using an automatic focal detection circuit 203.

In step S1705, the CPU 3 calculates a lens driving amount that is the driving amount of a lens 101 on the basis of the distance to the object detected in step S1704. The CPU 3 transmits the calculated lens driving amount to a focal adjustment circuit 118. The focal adjustment circuit 118 moves the lens 101 to a focal position via a lens driving member 114 on the basis of the received lens driving amount.

In step S1706, the CPU 3 determines whether release (switch SW2 operation) has been performed. When the release has not been performed, the CPU 3 returns to step S1701 and repeatedly performs the processing of steps S1701 to S1705. When the release has been performed, the CPU 3 proceeds to step S1707.

In step S1707, the CPU 3 performs setting processing to set a determination range (a range in which a focus degree is determined) with respect to a captured image. The determination range is set on the basis of the gaze information recorded on the memory unit 4. The setting processing of a determination range will be described in detail later.

In step S1708, the CPU 3 calculates the evaluation value of the focus degree of the determination range set in step S1707. The CPU 3 calculates the evaluation value of the focus degree on the basis of, for example, the contrast evaluation value of the determination range. The contrast evaluation value is, for example, the sum of the contrast values of a plurality of regions constituting the determination range. Note that the CPU 3 may calculate the evaluation value of the focus degree on the basis of a blur amount calculated using a point spread function (PSF). Note that the evaluation value of the focus degree is not limited to such a value but a value for evaluating whether the focus of an image is achieved may only be used.

In step S1709, the CPU 3 performs rating processing to rate a captured image on the basis of the evaluation value of the focus degree calculated in step S1708. The rating processing will be described in detail later.

In step S1710, the CPU 3 records the captured image and the rating result of step S1709 on the recording medium 5 in association with each other. The CPU 3 ends the recording processing when the power of the camera 1 is turned off.

Setting Processing of Determination Range

Next, the setting processing of a determination range performed in step S1707 of FIG. 17 will be described in detail with reference to FIG. 18A. FIG. 18A is a flowchart showing an example of the setting processing of a determination range according to the fourth embodiment.

In step S1801 of FIG. 18A, the CPU 3 sets the latest gaze position among a plurality of gaze positions indicated by gaze information recorded on the memory unit 4 in step S1702 as the central position (reference point) of a determination range.

In step S1802, the CPU 3 sets a range having a predetermined size about the reference point as the determination range with respect to a captured image. Note that the CPU 3 may change the size of the determination range according to information such as the focal distance of a photographing lens unit 1A or the settings of the camera. Further, the size of the determination range may be settable by the user.

FIG. 18B is a modified example of the setting processing of a determination range. In FIG. 18B, the CPU 3 sets a reference point according to a fluctuation in gaze positions recorded on the memory unit 4. Note that the processing of step S1815 is the same as that of step S1802 of FIG. 18A.

In step S1811, the CPU 3 acquires a fluctuation in gaze positions according to, for example, the method shown in step S1011 of FIG. 10B.

In step S1812, the CPU 3 determines whether the fluctuation calculated in step S1811 is less than a third threshold. The CPU 3 proceeds to step S1813 when the fluctuation is less than the third threshold, and proceeds to step S1814 when the fluctuation is at least the third threshold.

In step S1813, the CPU 3 acquires an average position of a plurality of gaze positions indicated by gaze information recorded on the memory unit 4 in step S1702 and sets the average position as a reference point. As described above, the CPU 3 sets a determination range about an average position of gaze positions when a fluctuation in gaze positions is less than the third threshold.

In step S1814, the CPU 3 sets the focus position of a captured image as the reference point. Note that the CPU 3 may set the central position of the image as the reference point. As described above, the CPU 3 sets a determination range about the focus position or the central position of an image when a fluctuation in gaze positions is at least the third threshold.

Rating Processing

Next, the rating processing performed in step S1709 of FIG. 17 will be described in detail with reference to FIG. 19. FIG. 19 is a flowchart of the rating processing according to the fourth embodiment. In FIG. 19, a method for performing the rating of a captured image at four levels on the basis of the evaluation value of a focus degree will be described as an example.

In step S1901, the CPU 3 determines whether the evaluation value of a focus degree calculated in step S1708 of FIG. 17 is at least a threshold A1. Note that a larger evaluation value indicates a higher focus degree of a determination range, that is, the achievement of focus in a region around a gaze position in the fourth embodiment. The CPU 3 proceeds to step S1902 when the evaluation value is at least the threshold A1, and proceeds to step S1903 when the evaluation value is less than the threshold A1.

In step S1902, the CPU 3 rates the level of a captured image as three stars. Note that the number of stars is an index. That is, a larger number indicates a higher focus degree, while a smaller number indicates a lower focus degree.

In step S1903, the CPU 3 proceeds to step S1904 when the evaluation value is at least a threshold A2, and proceeds to step S1905 when the evaluation value is less than the threshold A2. Note that the threshold A2 is a value smaller than the threshold A1.

In step S1904, the CPU 3 rates the level of the captured image as two stars.

In step S1905, the CPU 3 proceeds to step S1906 when the evaluation value is at least a threshold A3, and proceeds to step S1907 when the evaluation value is less than the threshold A3. Note that the threshold A3 is a value smaller than the threshold A2.

In step S1906, the CPU 3 rates the level of the captured image as one star.

In step S1907, the CPU 3 rates the captured image as no star (zero star). After rating the level of the image as any of no star to three stars, the CPU 3 ends a rating routine.

Note that an example in which the evaluation value of a focus degree is rated at four levels is described in FIG. 19 but the evaluation value may be rated at any level. Further, the CPU 3 may set the evaluation value itself of a focus degree as a rating value. Further, the calculation of a focus degree and rating are performed when an image captured by the imaging element 2 is recorded on the recording medium 5 in the fourth embodiment, but the calculation of a focus degree and the rating may be performed when an image recorded on the recording medium 5 is reproduced.

As described above, the camera 1 sets a determination range to determine the focus degree of an image on the basis of gaze information on the user in the fourth embodiment. The camera 1 performs rating with respect to the image according to the focus degree in the determination range and records the image and a rating result in association with each other. By referring to the rating result, the user is allowed to easily confirm the achievement of focus at a position intended by the user (photographer). Further, when selecting an image according to the achievement of focus, the user is allowed to select the image without taking time and effort for enlarging the image for confirmation.

Fifth Embodiment

In a fifth embodiment, a camera 1 has the reception function of receiving instructions to fix a gaze position at a specific position unlike the fourth embodiment. In addition, the camera 1 sets a determination range in consideration of whether instructions to fix a gaze position has been received and whether an image satisfies a predetermined condition. Hereinafter, a point different from that of the fourth embodiment will be mainly described.

Recording Processing

Figure 20:
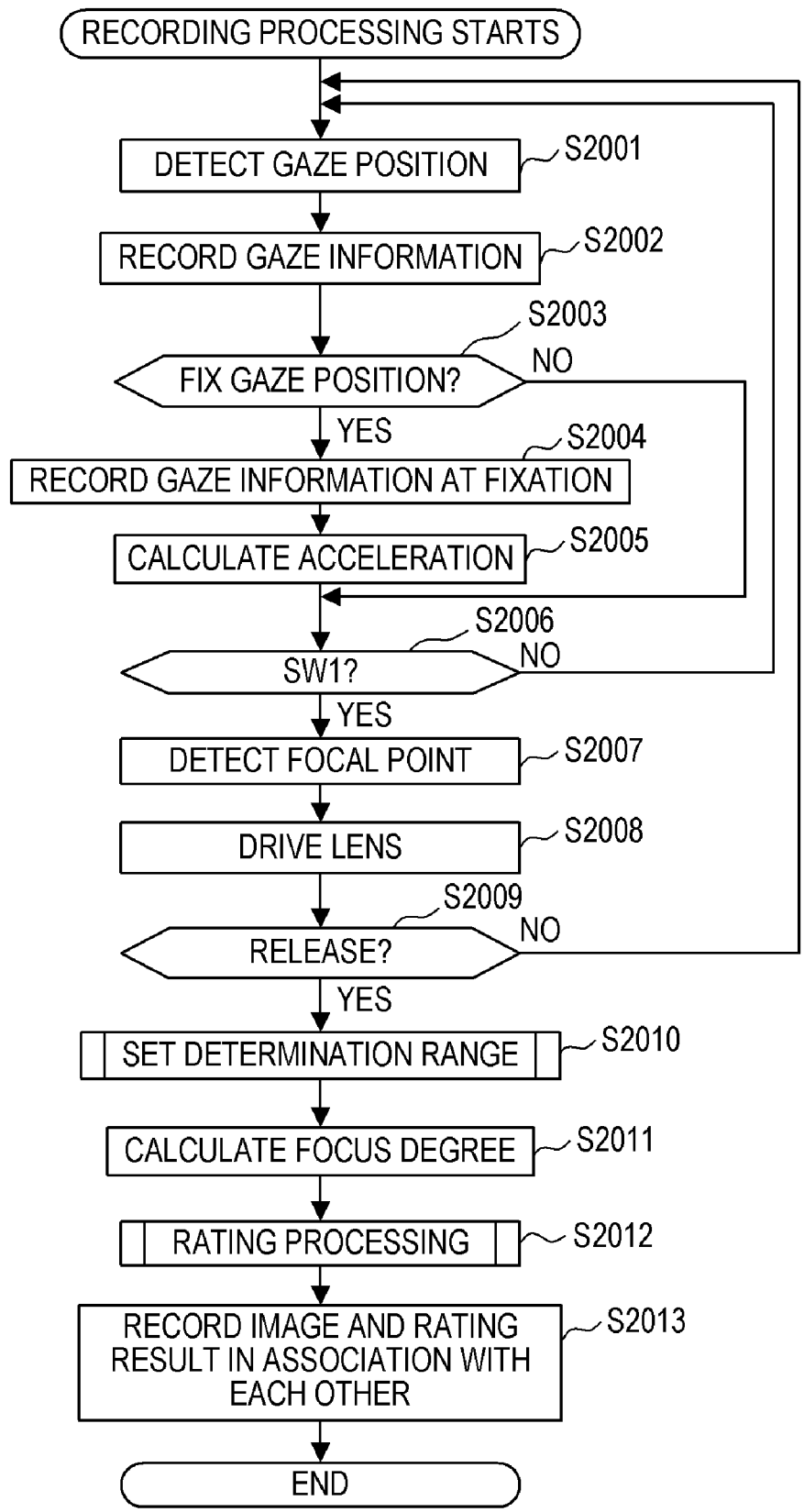
FIG. 20 is a flowchart of recording processing according to a fifth embodiment.

Recording processing according to the fifth embodiment will be described with reference to FIG. 20. FIG. 20 is a flowchart of the recording processing. Note that processing common to the recording processing shown in FIG. 11 or FIG. 17 will be omitted in the recording processing according to the fifth embodiment. Specifically, the processing of steps S2001 and S2002 of FIG. 20 is the same as that of steps S1701 and S1702 of FIG. 17. The processing of step S2005 of FIG. 20 is the same as that of step S1105 of FIG. 11. The processing of steps S2006 to S2009 and steps S2011 to S2013 of FIG. 20 is the same as that of steps S1703 to S1706 and steps S1708 to S1710 of FIG. 17.

In step S2003, a CPU 3 determines whether instructions to fix a gaze position have been received from a user. In the fifth embodiment, the user is allowed to provide instructions to fix a gaze position using, for example, any of operation members 41 to 43. The CPU 3 proceeds to step S2004 when the instructions to fix the gaze position have been received, and proceeds to step S2006 when the instructions to fix the gaze position have not been received.

In step S2004, the CPU 3 records the gaze information at the fixation of the gaze position in step S2003 on a memory unit 4. Note that the CPU 3 continues to perform a gaze detection operation even after receiving the instructions to fix the gaze position in step S2003 and records a plurality of gaze information including gaze positions other than the fixed position on the memory unit 4. The plurality of gaze information is recorded on the memory unit 4 so that the gaze information at the fixation of gaze position is discriminable.

In step S2010, the CPU 3 performs the setting processing of a determination range. The setting processing of a determination range will be described in detail later.

Setting Processing of Determination Range

Figure 21A:
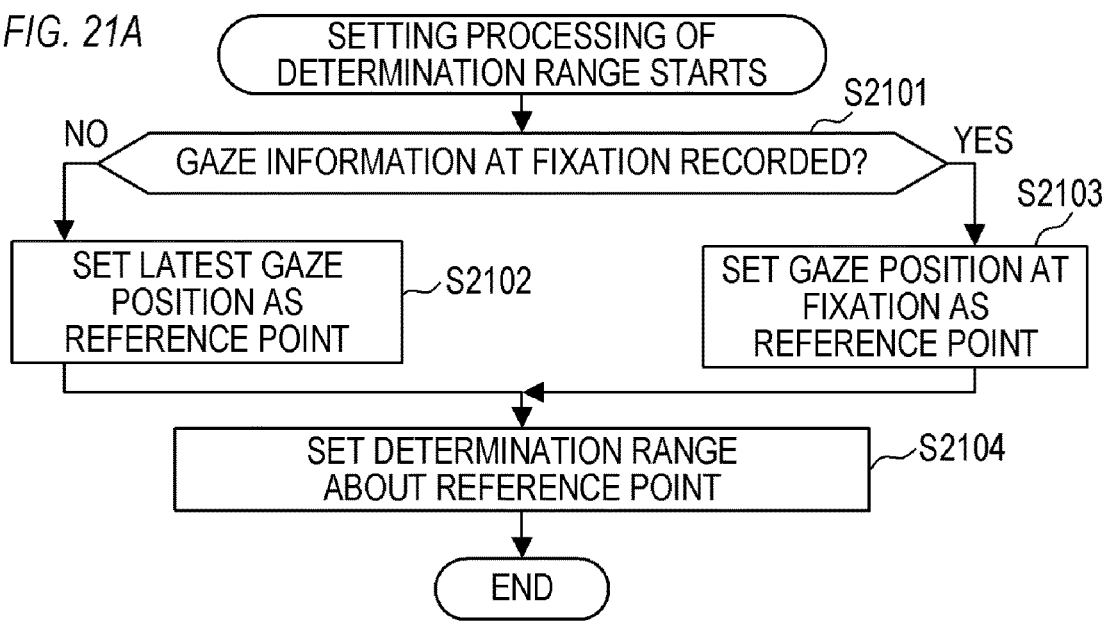

Next, the setting processing of a determination range performed in step S2010 of FIG. 20 will be described in detail with reference to FIG. 21A. FIG. 21A is a flowchart showing an example of the setting processing of a determination range according to the fifth embodiment.

In step S2101 of FIG. 21A, the CPU 3 determines whether gaze information at the fixation of a gaze position is recorded on the memory unit 4. The CPU 3 proceeds to step S2102 when the gaze information at the fixation of the gaze position is not recorded, and proceeds to step S2103 when the gaze information at the fixation of the gaze position is recorded.

In step S2102, the CPU 3 sets the latest gaze position (immediately before release) among a plurality of gaze positions indicated by the gaze information recorded on the memory unit 4 as the central position (reference point) of a determination range. Note that the CPU 3 may set the focus position of a captured image as the reference point in step S2102.

In step S2103, the CPU 3 sets a gaze position at the fixation of the gaze position in step S2003 as the reference point. As described above, the CPU 3 sets a determination range about a gaze position at the reception of instructions to fix the gaze position when gaze information at the fixation of the gaze position is recorded on the memory unit 4. Through the rating of the focus degree of an image with respect to a determination range thus set, the user is allowed to easily confirm whether the focus of an object region in which a photographer has fixed a gaze position is achieved.

In step S2104, the CPU 3 sets the determination range about the reference point with respect to the captured image like step S1802 of FIG. 18.

Figure 21B:
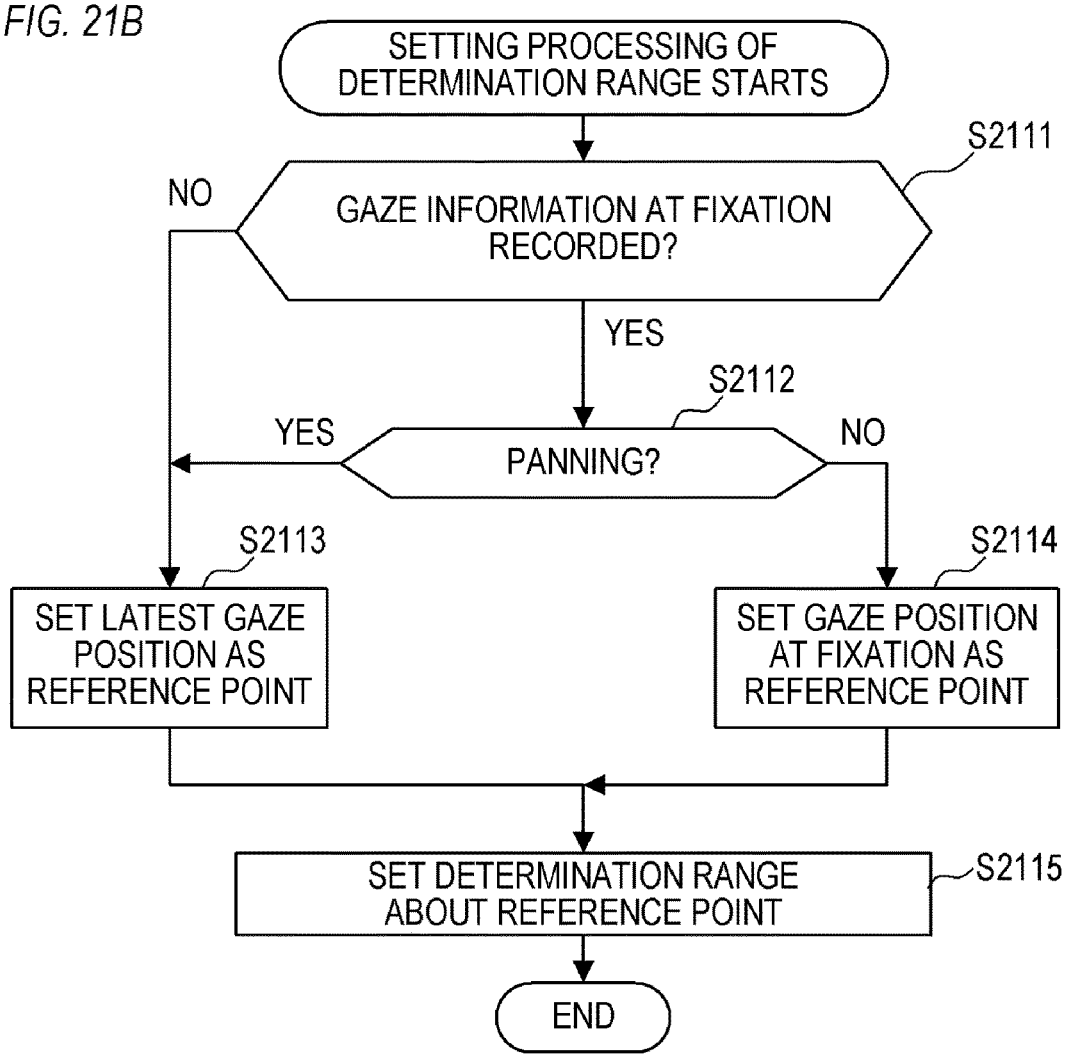

FIG. 21B is a modified example of the setting processing of a determination range. In FIG. 21B, the processing of step S2111 and steps S2113 to S2115 is the same as that of step S2101 and steps S2102 to S2104 of FIG. 21A. In FIG. 21B, the CPU 3 sets a reference point in consideration of whether an image satisfies a predetermined condition.

In step S2112, the CPU 3 determines whether a captured image satisfies a predetermined condition. In step S2112, the CPU 3 determines whether the captured image satisfies the predetermined condition like the method shown in step S1109 of FIG. 11. That is, in FIG. 21B, the predetermined condition is satisfied when the movement of the camera 1 is larger than a first threshold at the capturing of the image. The movement of the camera 1 is calculated on the basis of average acceleration or instantaneous acceleration before release in step S2009 after the CPU 3 has received instructions to fix a gaze position in step S2003. The CPU 3 proceeds to step S2113 when determining that panning has been executed (the predetermined condition is satisfied), and proceeds to step S2114 when determining that panning has not been executed (the predetermined condition is not satisfied).

FIG. 21C is a modified example of the setting processing of a determination range. In FIG. 21C, the processing of steps S2121, S2122, S2124, and S2125 is the same as that of steps S2111, S2112, S2114, and S2115 of FIG. 21B. FIG. 21C is different from FIG. 21B in a reference point set in step S2123 when a captured image satisfies a predetermined condition. In step S2123, the CPU 3 sets the focus position of a captured image as a reference point. Note that the CPU 3 may set the central position of the image as the reference point.

As described above, when panning is executed before release after the CPU 3 has received instructions to fix a gaze position, the CPU 3 sets a determination range about the latest gaze position, the focus position of an image, or the central position of the image. This is because there is a possibility that, when panning is executed, a gaze position at the fixation of the gaze position is different from the position of an object for which the achievement of focus is needed to be confirmed by the user.

Recording Processing

Figure 22:
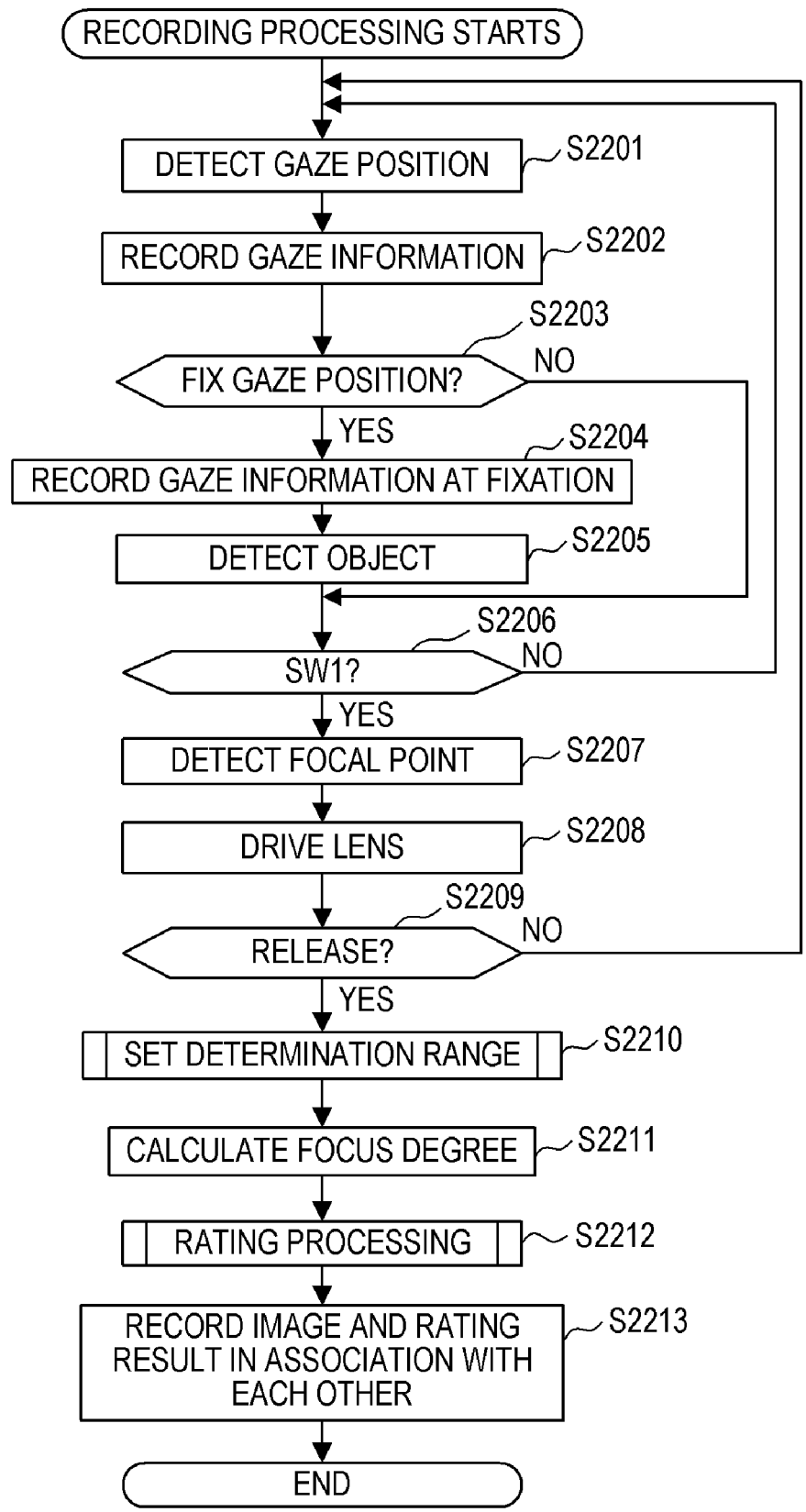
FIG. 22 is a flowchart of a modified example of recording processing according to the fifth embodiment.

Next, a modified example of the recording processing according to the fifth embodiment will be described with reference to FIG. 22. FIG. 22 is a flowchart of the recording processing. Note that the processing of steps S2201 to S2204, steps S2206 to S2209, and steps S2211 to S2213 of FIG. 22 is the same as that of steps S2001 to S2004, steps S2006 to S2009, and steps S2011 to S2013 of FIG. 20.

In step S2205, the CPU 3 detects an object (such as a face and a human body) from a region around a gaze position fixed in step S2203 using an image processing circuit 207. The CPU 3 continues the detection of the object until release and records the position of the detected object (coordinates on a display device 10 or a rear display) on the memory unit 4. Note that the CPU 3 detects the object according to, for example, the method shown in step S1305 of FIG. 13.

In step S2210, the CPU 3 performs the setting processing of a determination range. The setting processing of a determination range will be described in detail later.

Setting Processing of Determination Range

Figure 23A:
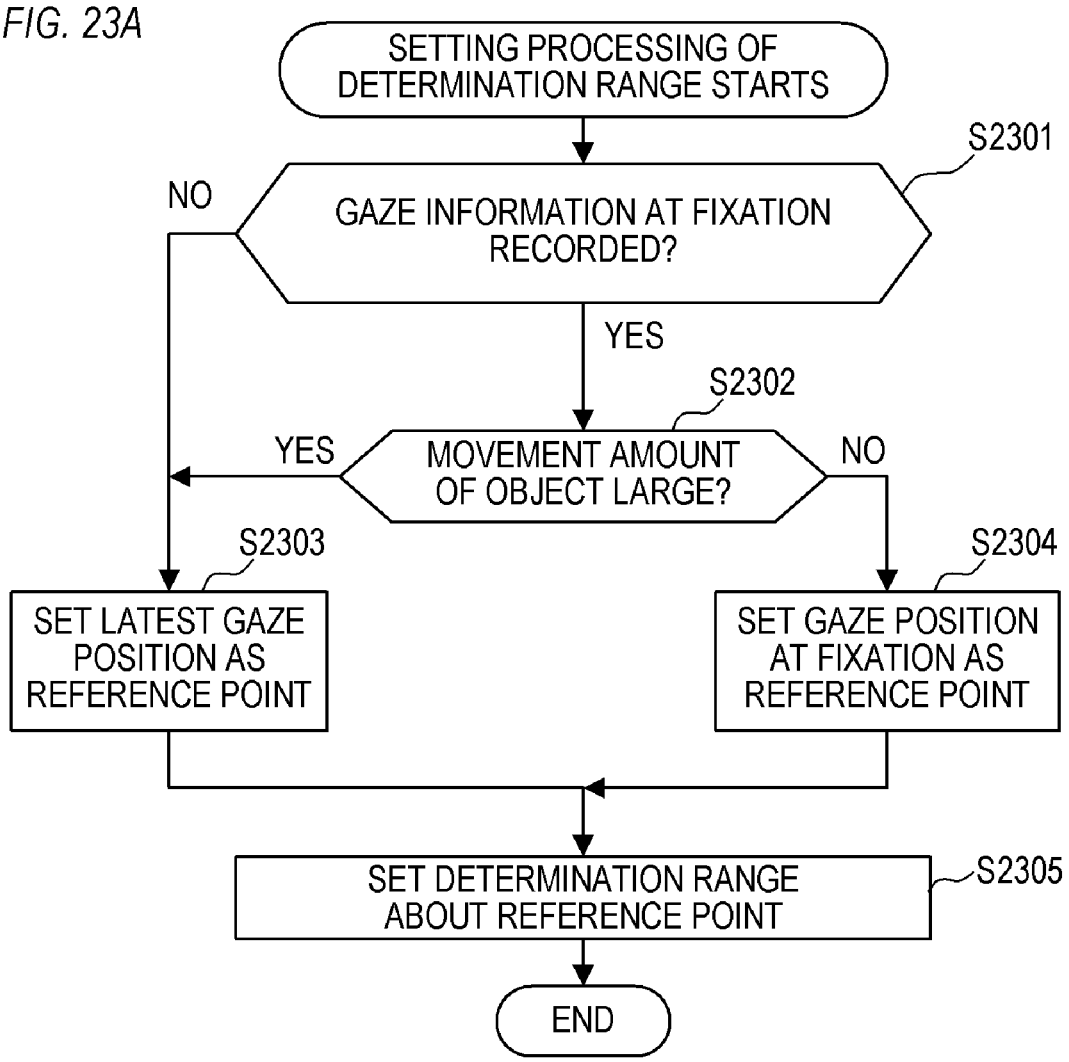

Next, the setting processing of a determination range performed in step S2210 of FIG. 22 will be described in detail with reference to FIG. 23A. FIG. 23A is a flowchart showing an example of the setting processing of a determination range according to the fifth embodiment. The processing of step S2301 and steps S2303 to S2305 of FIG. 23A is the same as that of step S2111 and steps S2113 to S2115 of FIG. 21B.

In step S2302, the CPU 3 determines whether a captured image satisfies a predetermined condition. In step S2302, the CPU 3 determines whether the captured image satisfies the predetermined condition like the method shown in step S1309 of FIG. 13. That is, in FIG. 23A, the predetermined condition is satisfied when the movement (movement amount) of an object is larger than a second threshold at the capturing of the image. The movement amount of the object is calculated on the basis of the movement amount (movement distance) of the object before release in step S2209 after the CPU 3 has received instructions to fix a gaze position in step S2203. The CPU 3 proceeds to step S2303 when determining that the movement amount of the object is large (satisfies the predetermined condition), and proceeds to step S2304 when determining that the movement amount is small (does not satisfy the predetermined condition).

FIG. 23B is a modified example of the setting processing of a determination range. In FIG. 23B, the processing of steps S2311, S2312, S2314, and S2315 is the same as that of steps S2301, S2302, S2304, and S2305 of FIG. 23A. FIG. 23B is different from FIG. 23A in a reference point set in step S2313 when an image satisfies a predetermined condition. In step S2313, the CPU 3 sets the focus position of a captured image as a reference point.

As described above, when the movement amount of an object is large before release after the CPU 3 has received instructions to fix a gaze position, the CPU 3 sets a determination range about the latest gaze position, the focus position of an image, or the central position of the image. This is because there is a possibility that, when the movement amount of an object is large, a gaze position at the fixation of the gaze position is different from the position of an object for which the achievement of focus is needed to be confirmed by a user.

As described above, in the fifth embodiment, the camera 1 sets a determination range to determine the focus degree of an image about the latest gaze position, the focus position of the image, or the central position of the image when the captured image satisfies a predetermined condition. When the captured image does not satisfy the predetermined condition, the camera 1 sets the determination range about a gaze position at the reception of instructions to fix the gaze position from the user. With this setting, a possibility that the focus degree of the image is determined at a position intended by the user (photographer) increases. Accordingly, the user is allowed to more easily confirm whether focus is achieved at a position intended by the user himself/herself.

According to the present disclosure, a photographer is allowed to easily confirm a noticed region.

Other Embodiments

The present invention has been described in detail above on the basis of the preferred embodiments. However, the present invention is not limited to the fixed embodiments and includes various modes without departing from its gist. Some of the above embodiments may be appropriately combined together.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the above embodiments describe a case in which the present invention is applied to a digital still camera. However, the present invention is not limited to the example and is applicable to any electronic device that is able to receive the input of a gaze at the recording of an image. For example, the present invention is applicable to tablet terminals, smart phones, or the like. Further, the above embodiments describe an example in which the recording of gaze information and an image and the reproduction of the image are performed by the same device. However, the recording and reproduction of an image may be performed by different devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-181327, filed on Nov. 5, 2021, which is hereby incorporated by reference herein in its entirety.

What is claimed is:

1. An electronic device comprising at least one memory and at least one processor which function as:
   a reading unit configured to read an image captured according to a photographer's capturing instruction and a plurality of gaze positions on a display looked by the photographer before receiving the photographer's capturing instruction, which are recorded in association with the image, from a recording medium;
   a display control unit configured to control the display;
   a setting unit configured to set a reference position for enlargement or reduction of the image on a basis of the plurality of gaze positions read from the recording medium; and
   a control unit configured to perform control to enlarge or reduce the image about the reference position set by the setting unit when enlarging or reducing the image read by the reading unit and displayed on the display by the display control unit.

2. The electronic device according to claim 1, wherein the at least one memory and the at least one processor further function as:
   a first acquisition unit configured to acquire the captured image according to the photographer's capturing instruction;
   a second acquisition unit configured to acquire the plurality of gaze positions on the display looked by the photographer before receiving the photographer's capturing instruction; and
   a recording unit configured to record the image acquired by the first acquisition unit and the plurality of gaze positions acquired by the second acquisition unit on the recording medium in association with each other.

3. The electronic device according to claim 2, wherein the at least one memory and the at least one processor further function as a determination unit configured to determine whether the image satisfies a predetermined condition, and
   the recording unit records the image, the plurality of gaze positions, and determination information indicating whether the image satisfies the predetermined condition on the recording medium in association with each other.

4. The electronic device according to claim 3, wherein the predetermined condition is satisfied when movement of an imaging device is larger than a first threshold at capturing of the image.

5. The electronic device according to claim 3, wherein the predetermined condition is satisfied when movement of an object is larger than a second threshold at capturing of the image.

6. The electronic device according to claim 3, wherein the reading unit further reads the determination information from the recording medium, and
   the setting unit sets the reference position on a basis of the determination information and the plurality of gaze positions read from the recording medium.

7. The electronic device according to claim 6, wherein, the at least one memory and the at least one processor further function as a first reception unit configured to receive the photographer's capturing instruction, and
   when enlarging or reducing the image read by the reading unit and displayed on the display by the display control unit,
   the setting unit sets, as the reference position, a focus position of the image, the central position of the image, or a latest gaze position among the plurality of gaze positions read by the reading unit in a case where the determination information read by the reading unit indicates that the image satisfies the predetermined condition, and
   the setting unit sets, as the reference position, the gaze position at the reception of the photographer's capturing instruction by the first reception unit among the plurality of gaze positions read by the reading unit in a case where the determination information read by the reading unit indicates that the image does not satisfy the predetermined condition.

8. The electronic device according to claim 2, wherein the at least one memory and the at least one processor further function as a second reception unit configured to receive an instruction to set whether the plurality of gaze positions recorded on the recording medium is used from the photographer.

9. The electronic device according to claim 8, wherein, the setting unit sets the reference position to be deferent depending on whether or not the second reception unit receives an instruction for setting to use the plurality of gaze positions recorded on the recording medium.

10. The electronic device according to claim 2, wherein, when enlarging or reducing the image acquired by the first acquisition unit and displayed on the display by the display control unit, the setting unit sets the reference position to be deferent depending on whether or not the plurality of gaze positions are acquired by the second acquisition unit.

11. The electronic device according to claim 2, wherein the at least one memory and the at least one processor further function as a third reception unit configured to receive an instruction to set whether the plurality of gaze positions acquired by the second acquisition unit is displayed on the display from the photographer.

12. The electronic device according to claim 11, wherein, when enlarging or reducing the image acquired by the first acquisition unit and displayed on the display by the display control unit, the setting unit sets the reference position to be deferent depending on whether or not the third reception unit receives an instruction for setting to display the plurality of gaze positions on the display.

13. The electronic device according to claim 1, wherein the setting unit sets the reference position to be deferent depending on a fluctuation in the plurality of gaze positions read from the recording medium.

14. The electronic device according to claim 13, wherein the setting unit sets, as the reference position, an average position of the plurality of gaze positions in a case where the fluctuation in the plurality of gaze positions is less than a third threshold.

15. The electronic device according to claim 13, wherein the setting units sets, as the reference position, the focus position of the image or the central position of the image in a case where the fluctuation in the plurality of gaze positions is a third threshold or more.

16. The electronic device according to claim 1, wherein the plurality of gaze positions are gaze positions on the display looked by the photographer before receiving the photographer's capturing instruction after the power of the electronic device is turned on.

17. The electronic device according to claim 2, wherein the setting unit sets, as the reference position, a latest gaze position among the plurality of gaze positions read from the recording medium.

18. The electronic device according to claim 1, wherein the at least one memory and the at least one processor further function as a reproduction unit configured to the captured image, and
the image to be reproduced by the reproduction unit is enlarged or reduced.

19. A control method of an electronic device, comprising:
a reading step of reading an image captured according to a photographer's capturing instruction and a plurality of gaze positions on a display looked by the photographer before receiving the photographer's capturing instruction, which are recorded in association with the image, from a recording medium;
a display control step of controlling the display;
a setting step of setting a reference position for enlargement or reduction of the image on a bias of the plurality of gaze positions read from the recording medium; and
a control step of performing control to enlarge or reduce the image about the reference position set in the setting step when enlarging or reducing the image read in the reading step and displayed on the display in the display control step.

20. A non-transitory computer readable medium that stores a program, wherein the program causes a computer to execute a control method of an electronic device, comprising:
a reading step of reading an image captured according to a photographer's capturing instruction and a plurality of gaze positions on a display looked by the photographer before receiving the photographer's capturing instruction, which are recorded in association with the image, from a recording medium;
a display control step of controlling the display;
a setting step of setting a reference position for enlargement or reduction of the image on a basis of the plurality of gaze positions read from the recording medium; and
a control step of performing control to enlarge or reduce the image about the reference position set in the setting step when enlarging or reducing the image read in the reading step and displayed on the display in the display control step.

* * * * *